United States Patent
Barrett et al.

(10) Patent No.: US 10,764,134 B2
(45) Date of Patent: Sep. 1, 2020

(54) CONFIGURING A FIREWALL SYSTEM IN A VEHICLE NETWORK

(71) Applicant: BlackBerry Limited, Waterloo (CA)

(72) Inventors: Stephen John Barrett, Haywards Heath (GB); Adam John Boulton, Wirral (GB); Jonathon Brookfield, Great Cambourne (GB); Nicholas James Russell, Newbury (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/249,735

(22) Filed: Jan. 16, 2019

(65) Prior Publication Data
US 2019/0394089 A1     Dec. 26, 2019

Related U.S. Application Data

(60) Provisional application No. 62/688,790, filed on Jun. 22, 2018.

(51) Int. Cl.
*H04L 12/24* (2006.01)
*G06F 8/75* (2018.01)
(Continued)

(52) U.S. Cl.
CPC ............ *H04L 41/0816* (2013.01); *G06F 8/75* (2013.01); *H04L 41/12* (2013.01);
(Continued)

(58) Field of Classification Search
CPC ......... H04L 51/12; H04L 12/24; H04L 29/06; H04L 41/0816; H04L 63/0209;
(Continued)

(56) References Cited

U.S. PATENT DOCUMENTS 8,555,385 B1 * 10/2013 Bhatkar ............... G06F 21/556
                                                          726/22
8,782,773 B2 *  7/2014 Chou ...................... G06F 9/54
                                                          370/310
(Continued)

OTHER PUBLICATIONS

Rizvi et al., "Protecting an automobile network using distributed firewall system." Proceedings of the Second International Conference on Internet of things, Data and Cloud Computing. ACM, Mar. 22, 2017, 6 pages.
(Continued)

*Primary Examiner* — Sargon N Nano
(74) *Attorney, Agent, or Firm* — Fish & Richardson P.C.

(57) ABSTRACT

Systems, methods, and software can be used to configure a firewall system in a vehicle network. In some aspects, a computer-implemented method includes receiving a software code of a network node connected to a trusted network of a vehicle network that includes the trusted network internal to a vehicle and an untrusted network external to the vehicle, wherein the trusted network includes one or more functional domains for controlling functionalities of the vehicle; performing an analysis of the software code to identify connectivity of the network nodes in the vehicle network; determining connectivity information of the network nodes in the vehicle network based on the analysis, wherein the connectivity information includes at least one of Network Layer connectivity information, Transport Layer connectivity information, or Application Layer connectivity information; and configuring one or more firewalls in the vehicle network based on the connectivity information.

21 Claims, 11 Drawing Sheets

(51) Int. Cl.
   *H04L 29/06*      (2006.01)
   *H04L 29/08*      (2006.01)
(52) U.S. Cl.
   CPC ........ *H04L 63/0209* (2013.01); *H04L 63/101*
   (2013.01); *H04L 63/1416* (2013.01); *H04L*
   *67/12* (2013.01); *H04L 67/34* (2013.01)
(58) Field of Classification Search
   CPC ....... H04L 63/101; H04L 67/12; H04L 41/12;
   H04L 67/34; H04L 63/1416; H04L
   63/0227; G06F 2212/1052; G06F 21/85;
   G06F 21/71; G06F 21/74; H04W 12/06;
   H04W 12/08
   See application file for complete search history.

(56)              References Cited

U.S. PATENT DOCUMENTS

| | | | | |
|---|---|---|---|---|
| 9,866,527 | B2* | 1/2018 | Moriya | ............... H04L 63/0209 |
| 2007/0118879 | A1* | 5/2007 | Yeun | .................. H04L 63/0815 |
| | | | | 726/3 |
| 2008/0109871 | A1* | 5/2008 | Jacobs | .................... H04L 63/20 |
| | | | | 726/1 |
| 2010/0251328 | A1* | 9/2010 | Syed | ....................... H04L 63/20 |
| | | | | 726/1 |
| 2011/0083186 | A1* | 4/2011 | Niemela | ............... G06F 21/566 |
| | | | | 726/24 |
| 2013/0086625 | A1* | 4/2013 | Driscoll | ................... G06F 8/40 |
| | | | | 726/1 |
| 2013/0097660 | A1* | 4/2013 | Das | ......................... G06F 21/52 |
| | | | | 726/1 |
| 2014/0136710 | A1* | 5/2014 | Benari | ................. G06F 9/5061 |
| | | | | 709/226 |
| 2014/0310788 | A1 | 10/2014 | Ricci | |
| 2015/0150124 | A1* | 5/2015 | Zhang | ................. H04L 63/1408 |
| | | | | 726/22 |
| 2016/0330288 | A1* | 11/2016 | Hoffman | ................ H04L 67/10 |
| 2017/0250905 | A1* | 8/2017 | Park | ........................ H04L 45/66 |
| 2017/0295188 | A1* | 10/2017 | David | ................ H04L 63/0428 |
| 2017/0366521 | A1 | 12/2017 | Lei et al. | |
| 2018/0205703 | A1* | 7/2018 | Grau | .................... H04L 63/0236 |
| 2019/0394089 | A1* | 12/2019 | Barrett | .................... H04L 67/12 |

OTHER PUBLICATIONS

Extended European Search Report issued in European Application No. 19181048.0 dated Oct. 29, 2019, 10 pages.
"Automotive Gateway: A key component to securing the connected car," NXP Semiconductors, Jan. 2018, 6 pages.
Moon [online], "Server and client example with C sockets on Linux," Binary Tides: Coding, Software, Tech and Reviews, Jul. 30, 2012, [retrieved on Apr. 30, 2019], retrieved from URL: <https://www.binarytides.com/server-client-example-c-sockets-linux/>, 6 pages.
Chegg Study [online], "Question: Table 9.5 shows a sample of packet filter firewall reset for an imaginary network of IP address that range from 192.168.10 ti 192.168.1.254," available on or before 2003, [retrieved on Apr. 30, 2019], retrieved from: URL <https://www.chegg.com/homework-help/questions-and-answers/table-95-shows-sample-packet-filter-firewall-ruleset-imaginary-network-ip-address-range-19-q5939409>, 2 pages.
Lopategui [online], "Systems Engineers, the multi-domain 3D revolution is coming for you," GrabCAD Blog, available on or before Mar. 18, 2015, [retrieved on Apr. 30, 2019], retrieved from: URL <https://blog.grabcad.com/blog/2015/03/18/multi-domain-3d-revolution/>, 7 pages.

* cited by examiner

```
SCANNING SOURCE CODE FOR EXPECTED LAYER THREE AND FOUR CONNECTIVITY
(TCP/IP C-CODE EXAMPLE)
                                                  800
#include <stdio.h>
#include <string.h>
#include <sys/socket.h>  ⎤
include <arpa/inet.h>   ⎦ int ip_comms(char msg_to_send[1000], char msg_recv[2000]) {
    int sock;
    struct sockaddr_in server;

//Create socket
    sock = socket(AF_INET , SOCK_STREAM , 0);
    if (sock == -1) {
        perror("Could not create socket");
        return 1;
    }
    server.sin_addr.s_addr = inet_addr("10.10.10.10");
    server.sin_family = AF_INET;
    server.sin_port = htons(80);

//Connect to remote server
    if (connect(sock , (struct sockaddr *)&server , sizeof(server)) < 0) {
        perror("connect failed. Error");
        return 1;
    }

//Send data to server
    if( send(sock , msg_to_send , strlen(msg_to_send) , 0) < 0) {
        perror("Send failed");
        return 1;
    }

//Receive data from server
    while(1) {
        if( recv(sock , msg_recv , 2000 , 0) < 0) {
            break;
        }
    }
    close(sock);
    return 0;
}
```

810 — INCLUSION OF IP COMMUNICATIONS LIBRARIES

820 — 'AF_INET' AND 'SOCK_STREAM' INDICATES USE OF TCP OVER IP

830 — DESTINATION IP ADDRESS OF SERVER

840 — PORT NUMBER (e.g. INDICATES HTTP)

850 — 'SEND' INDICATES SOFTWARE IS ACTING AS A CLIENT

860 — 'RECV' INDICATES SOFTWARE IS ACTING AS A SERVER

FIG. 8

SCANNING SOURCE CODE FOR EXPECTED APPLICATION CONTENT TYPE
(HTTP/TCP/IP EXAMPLE)

900

910
- ANALYZE CODE OF ALL PERMUTATIONS OF HOW THIS VARIABLE IS CREATED AND WITH WHAT VALUES
- e.g. IS ASSIGNED CONTENTS OF AN XML FILE

```
FILE *f = fopen("Configfile.xml", "rb");
fseek(f, 0, SEEK_END);
long fsize = ftell(f);
fseek(f, 0, SEEK_SET);

char *msg_to_send = malloc(fsize + 1);
fread(msg_to_send, fsize, 1, f);
msg_to_send[fsize] = 0;
fclose(f);
```

920
- ANALYZE CODE OF WHERE THIS VARIABLE'S VALUE IS CHECKED
- e.g. ANY CONTENT CHECKING ROUTINES SUCH AS THOSE USED IN KNOWN LIBRARIES (SUCH AS CURL)

```
res = curl_easy_getinfo(msg_recv, CURLINFO_CONTENT_TYPE, &ct);
if (ct=="text/xml") {
```

```
int ip_comms(char msg_to_send[1000], char msg_recv[2000]) {

//Send data to server
    if( send(sock, msg_to_send, strlen(msg_to_send), 0) < 0) {
        perror("Send failed");
        return 1;
    }

//Receive data from server
    while(1) {
        if( recv(sock, msg_recv, 2000, 0) < 0) {
            break;
        }
    }
}
```

FIG. 9

CONFIGURING A FIREWALL SYSTEM IN A VEHICLE NETWORK

CROSS REFERENCE TO RELATED APPLICATION

This patent claims the benefit of U.S. Provisional Application No. 62/688,790, filed Jun. 22, 2018, the entire contents of which are hereby expressly incorporated by reference herein in its entirety.

TECHNICAL FIELD

The present disclosure relates to configuring a firewall system in a vehicle network.

BACKGROUND

Modern vehicles typically include various electronic devices. The various electronic devices can form a vehicle network that enables communications between the vehicle and one or more external networks, as well as communications between different electronic devices internal to the vehicle. A vehicle network can be a potential target for remote attacks. Without proper protection, the vehicle network can be compromised, resulting in device malfunction, loss of control, and driver injury.

DESCRIPTION OF DRAWINGS

FIG. 8 is a plot showing example types of information that a static code analysis can identify to determine Layer 3 and Layer 4 connectivity of an example vehicle network, according to an implementation.

FIG. 9 is a plot showing example types of information that a static code analysis can identify to determine expected application content type of an application layer in use of an example vehicle network, according to an implementation.

Like reference numbers and designations in the various drawings indicate like elements.

DETAILED DESCRIPTION

Figure 1:
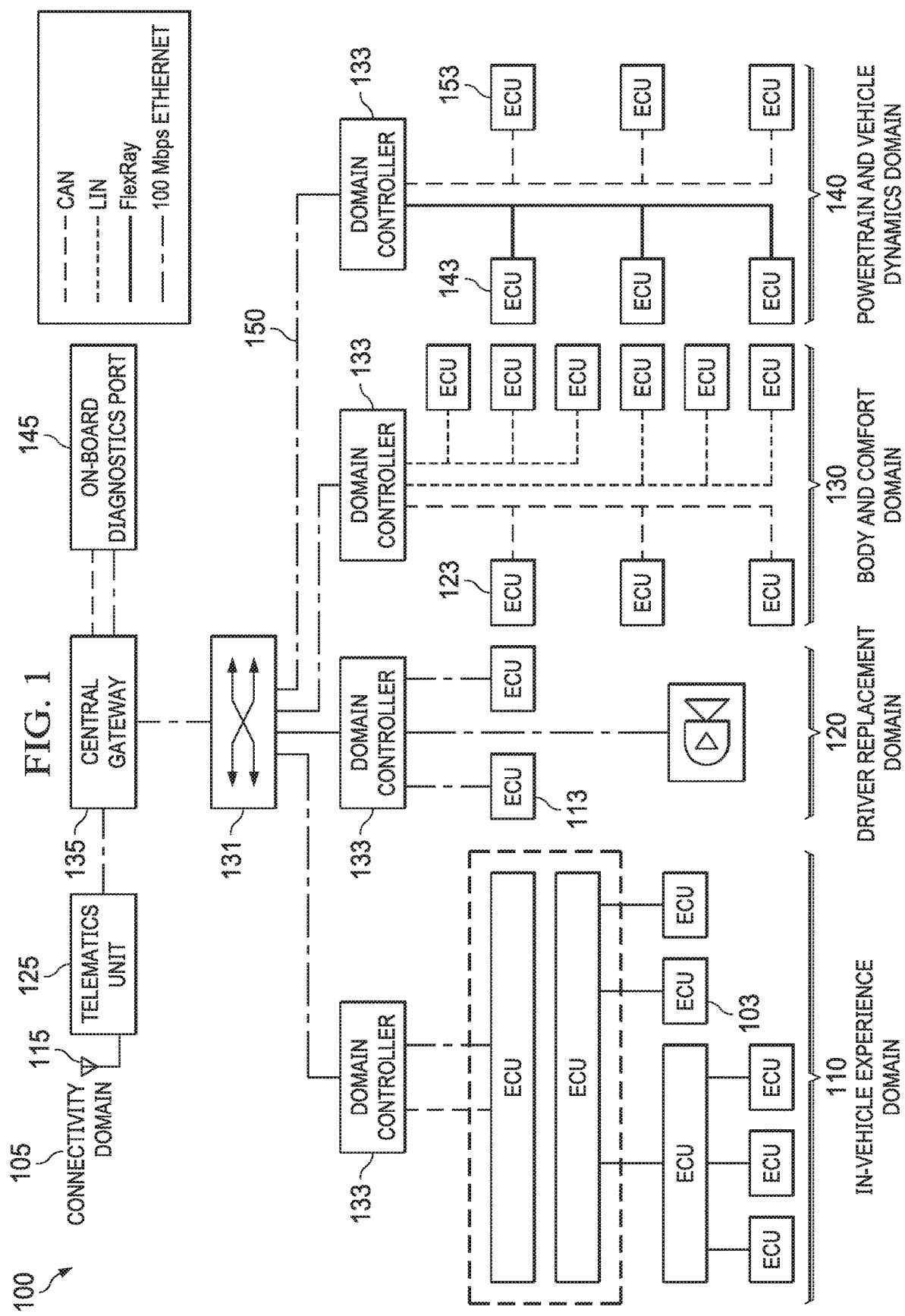
FIG. 1 is a schematic diagram showing an example vehicle network, according to an implementation.

For secure and reliable communications over a vehicle network, in some implementations, a firewall system can be built into the vehicle network to perform traffic monitoring, filtering, and policing. The firewall system can include one or more firewalls that only permit desired and expected traffic through the firewall, while blocking other unauthorized traffic. In some implementations, the firewall system can also perform intrusion detection to detect intruders or anomalies, and take actions accordingly.

In some implementations, a vehicle network can include multiple functional domains (sub-networks). The firewall system can perform inter-domain firewalling, intra-domain firewalling, and a combination of the two. In some implementations, inter-domain firewalling can be implemented where one or more firewalls are deployed at one or more interfaces between separate functional domains, possibly at bridging, routing, or gateway nodes. In some implementations, intra-domain firewalling can be implemented where one or more firewalls are deployed within a functional domain. As one example, a firewall can be implemented on a domain controller (DC), or between the DC and a network to which the DC is connected. As another example, a firewall can be implemented in one or more endpoints (e.g., Electronic Control Units (ECUs), sensors, or actuators) in the functional domain, or between the endpoint and the network to which the endpoint is connected. An ECU is an electronic device or system that controls one or several electrical elements in a vehicle. For example, an ECU can include a door control unit (DCU), a brake control module, a powertrain control module, a battery management system, etc.

Example techniques for configuring a firewall system in a vehicle network are described. At a high level, the disclosure describes example techniques determining allowed (i.e., whitelisted) connectivity between or among network nodes in a vehicle network. The connectivity can be between domains or domain controllers (also referred to as "inter domain connectivity"), or within a domain (also referred to "intra-domain connectivity"). In some implementations, the connectivity can be between domain controllers and ECUs, or between ECUs. The connectivity can be determined based on analysis of a code of a network node connected to a trusted network of the vehicle. The analysis can include static code analysis, dynamic code analysis, or both. In some implementations, once the connectivity is determined, the connectivity information can be presented as an "Advisory" to derive firewall rules. In some implementations, the connectivity information determined from static code scan and/or dynamic analyses can be compared with that which was specified as being necessary at the system design phase and this information can be used in determining how and whether to update firewall rules or intrusion detection behaviour accordingly. In some implementations, the firewall rules and/or intrusion detection behaviour can be automatically derived based on the connectivity information The described techniques can achieve one or more advantages. For example, the described techniques can enhance security and reliability of communications over the vehicle network. The example techniques can reduce the risk of successful cyberattacks and improve driver safety for connected cars technologies. The example techniques can also be used for autonomous driving which requires secure connectivity and high-bandwidth communications between ECUs across functional domains. The example techniques can apply to any automotive or vehicular networking technology including, for example, IP/Ethernet, CAN (Control Area Network), LIN (Local Interconnect Network), Flexray, and Media Oriented System Transport (MOST).

The example techniques allow a firewall system to be implemented in the vehicle network in an efficient, not manually intensive manner. In some implementations, the example techniques can verify that connectivity available in the deployed code is consistent with that expected at the system design stage. The example techniques can help determine how to efficiently produce firewall and intruder detection system configurations for different model types and for vehicle customisations.

FIG. 1 is a schematic diagram showing an example vehicle network 100, according to an implementation. The vehicle network 100 can include various network nodes that enable secure and reliable communications among the vehicle's electronic systems. The network node can include application software that can be executed by one or more processors. The network nodes can include ECUs (e.g., ECUs 103, 113, 123, 143, 153), domain controllers (DCs, e.g., DCs 133), sensors, actuators, or any other types of electronic devices or computers that are capable of data communications. Different network nodes can have different network interfaces that communicate over different network protocols. In some implementations, the internal network 100 can be a heterogeneous network. For example, a vehicle can integrate over 100 ECUs connected over multiple networks such as CAN (Control Area Network), LIN (Local Interconnect Network), FlexRay, and Ethernet.

In some implementations, the vehicle network 100 can include different functional domains, each functional domain including one or more network nodes. In some implementations, one or more network nodes are grouped together into a functional domain such that applications and communications of the one or more network nodes within the functional domain are concerned with providing a certain type of functionality (e.g., Driver replacement functionality). In some implementations, several network nodes are grouped together because they are concerned with providing disparate functionality for a certain physical location within the car (e.g., dashboard). In some implementations, network nodes are grouped together into a functional domain based on a combination of the two above criteria or based on additional or different criteria.

In some implementations, a network node (e.g., an ECU) within a functional domain can be designated as a domain controller (DC) of the functional domain. In some implementations, the functional domain can have a hierarchy of network nodes, with the DC being the representative or dominant one. The DC can include software code executable by one or more hardware processors for providing inter-domain connection of this functional domain and another functional domain or the external network, and intra-domain connection between network nodes within the functional domain.

Example functional domains can include one or more of a powertrain domain, chassis and safety domain, body control domain, infotainment domain, telematics domain, ADAS domain, or any other domains. In some implementations, these functional domains may be named differently. In some implementations, an internal network of a vehicle can include additional or different functional domains. In some implementations, functional domains of an internal network of a vehicle can be divided in a different manner.

As illustrated in FIG. 1, the internal network 100 includes a connectivity domain 105, an in-vehicle experience domain 110, a driver replacement domain 120, a body and comfort domain 130, and a powertrain and vehicle dynamics domain 140. The connectivity domain 105 includes network nodes such as one or more of an antenna 115, a telematics unit 125, a central gateway 135, or an on-board diagnostics port 145. The connectivity domain 105 can provide communications between the internal network 100 of the vehicle and one or more external networks of the outside world, for example, through the antenna 115. The connectivity domain 105 can also provide communications between many functional domains and network nodes (e.g., ECUs) of the internal network 150, for example, through an Ethernet switch 131 connected to the central gateway 135.

Figure 2:
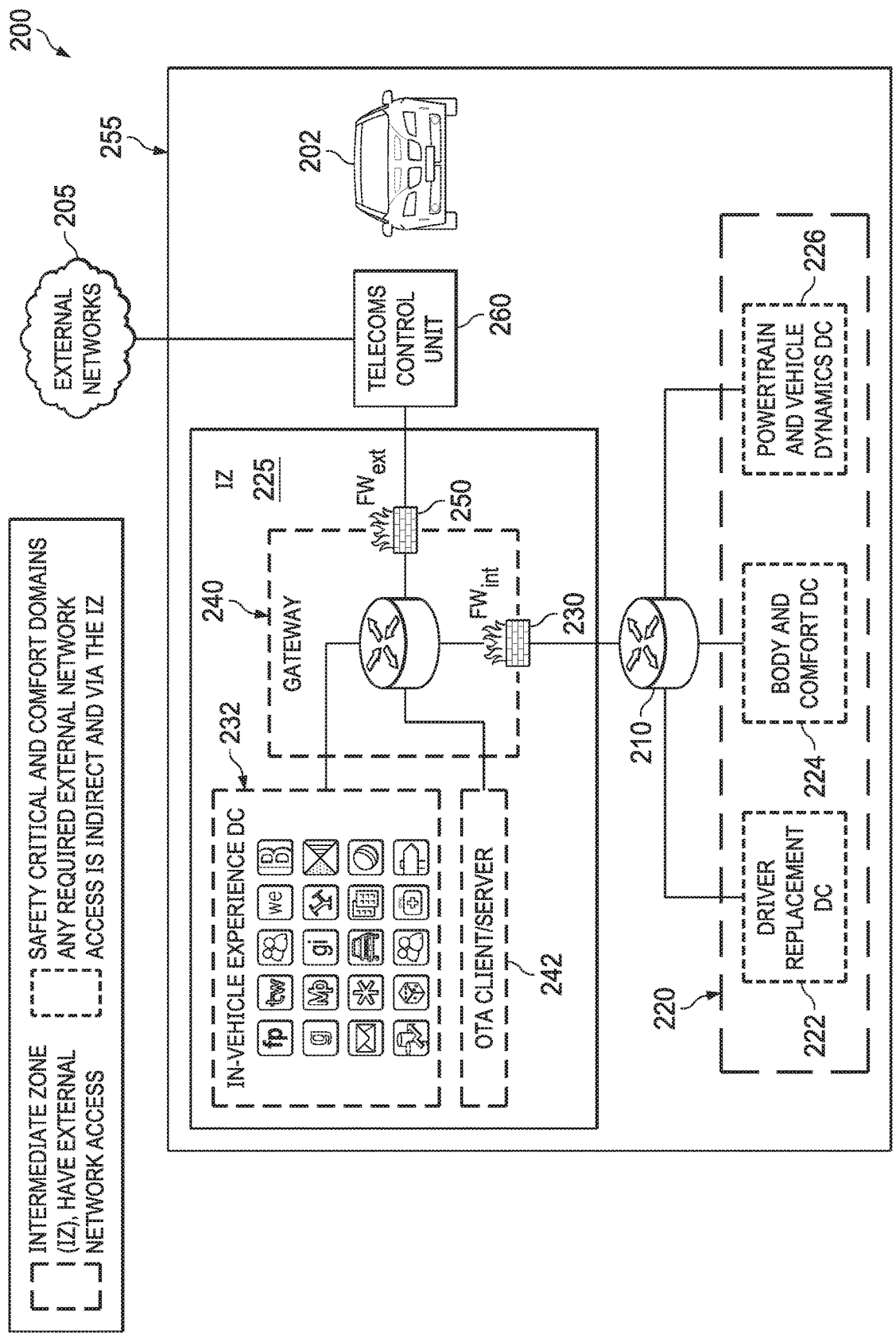
FIG. 2 is a schematic diagram showing another example vehicle network, with an example implementation of inter-domain firewalling in the another example vehicle network, according to an implementation.

FIG. 2 is a schematic diagram showing another example vehicle network 200, according to an implementation. The example vehicle network 200 of a vehicle 202 is modelled based on an enterprise network configuration. A vehicle network architecture 200 can be configured in another manner.

At a high level, the example vehicle network 200 includes an internal network 255 and one or more external networks 205 that are communicatively coupled with each other, for example, through a Telematics Unit (e.g., a telecoms control unit 260) of the vehicle 202. The Telematics Unit can provide, for example, one or more of wireless connectivity (e.g., cellular, Wi-Fi, Wireless Tyre Pressure Sensing, or other types of wireless communications) or wired connectivity (e.g. via vehicle diagnostic ports (e.g., ODBII)) between the internal network 255 and the external networks 205.

In some implementations, the one or more external networks 205 can include one or more untrusted external networks to the vehicle 202, such as the public internet. The internal network 255 can include a trusted network 220 internal to the vehicle 202. In some implementations, the internal network 255 can optionally include an intermediate zone (IZ) 225 that is neither fully untrusted, nor fully trusted. The IZ 225 can also be referred to as a De-Militarised Zone (DMZ), which falls between the trusted internal network 220 and the untrusted external networks 205. The IZ 225 internal to the vehicle 202 can include one or more functional domains and respective DCs. For example, the IZ 225 includes one or more of in-vehicle experience domain with an in-vehicle experience DC 232, an Over The Air (OTA) client/server 242, or a gateway 240.

In some implementations, software (including servers and clients) deployed in the IZ 225 can be tailored for vehicles. For example, the OTA software update service might act as a client towards an OTA server on an external network whilst acting as a server to clients within the trusted network that need the software updates. As another example, infotainment services can include applications that are commonly downloaded to handsets, but which are being deployed on the car infotainment system itself. In some implementations, some of the apps in the in-vehicle experience domain 232 obtained from the external network may be vehicle specific. Web browsing type functionality might also be provided on the infotainment system.

In some implementations, similarly to an enterprise network, an IZ 225 can also include proxy servers, such as email servers or web servers which are accessible to the external networks 205 and the trusted network 220. Hosts or servers within the trusted network 220 may access these proxy servers and may not have direct access to the external networks 205. The proxy servers relay traffic between the trusted network 220 and the external network 205. In some implementations, the proxy servers can additionally perform security checks on traffic and potentially block certain traffic from being transferred.

In some implementations, the IZ 225 has direct access to the external networks 205, for example, through a telecoms control unit 260 of the vehicle 202. On the other hand, the trusted network 220 does not have direct access to the external networks 205. For example, the trusted network 220's access to the external networks 205 is indirect and has to go through IZ 225.

The trusted network 220 internal to the vehicle 202 can include one or more functional domains and respective DCs. For example, the trusted network 220 includes one or more of a driver replacement DC 222, a body and comfort DC 224, or powertrain and vehicle dynamics DC 226. The trusted network 220 can include additional or different domains and DCs (e.g., in some implementations, an in-vehicle experience domain can be included in the trusted network 220).

Unlike software codes in a trusted internal network of an enterprise which can be particularly voluminous (e.g., each host such as each employee's laptop can have millions of lines of codes running on it) and constantly changing as new apps are downloaded or deleted, the amount of software codes in the trusted network 220 of the vehicle 202 is much less compared to that in an enterprise network. In addition, the software codes in the trusted network 220 of the vehicle 202 can be relatively stable or fixed (at least in the periods between the OTA software updates. For example, software codes of the network nodes in the trusted network 220 can be stable and known a priori to an original equipment manufacturer (OEM) of the vehicle 202. In some implementations, such software codes can be updated from time to time via software update, e.g., through the Over The Air (OTA) software update service provided by the OTA client/server 242. In some implementations, the update is expected to be infrequent and the OEM can also provide/derive new firewall rules at the same time as the software update.

In some implementations, a firewall system can be deployed in the vehicle network 200 to provide secure and reliable communications. The firewall system can include one or more firewalls that can filter inbound and outbound network traffic based on predetermined rules, and disallow data transfers from unauthorized sources. The firewalls may perform context-aware filtering or any other types of advanced traffic filtering. For example, a firewall can be configured to allow packets of a type that appear on a whitelist to pass through the firewall, while blocking packets of a type that do not appear on the whitelist. In some implementations, a firewall can be configured to perform intrusion detection to detect when a packet is blocked by the firewall and then to log, report, and/or take other action. The firewall system can provide inter-domain firewalling, intra-domain firewalling, or both.

For example, one or more firewalls can be placed between the IZ 225 and the trusted network 220 to restrict and inspect the traffic that is allowed to pass between the IZ 225 and the trusted network 220. In some other implementations, an IZ may not be present in an internal network 255 of the vehicle 202. In some implementations, the one or more firewalls can be placed between the IZ 225 and the external network 205 and can be used to ensure that only certain types of traffic can pass into the IZ 225.

In some implementations, these firewalls may be provided by different vendors to gain improved security through diversity of firewall product development (e.g. a security flaw in one product may not exist in the other product). In other architectures the same logical firewalling effect (but without the product development diversity) may be achieved with a single firewall.

FIG. 2 shows an example implementation of inter-domain firewalling in the example vehicle network 200. The example implementation of inter-domain firewalling can ensure that only certain types of traffic can pass from the external network 205 into the trusted network 220 internal to the vehicle 202. As illustrated, the trusted network 220 is connected to the IZ 225 via a switch or router 210, which is further connected to a gateway 240 of the IZ 225 for connection to the external network 205 through the telecoms control unit 260. In one example implementation, an internal firewall, $FW_{int}$, 230 is placed between the switch or router 210 of the the trusted network 220 and the gateway 240 of the IZ 225. An external firewall, $FW_{ext}$, 250 is placed between the gateway 240 of the IZ 225 and the telecoms control unit 260. In some implementations, only one firewall (e.g., either the internal firewall, $FW_{int}$, 230 or the external firewall, $FW_{ext}$, 250) is sufficient to provide enhanced security communication through inter-domain firewalling.

Figure 3:
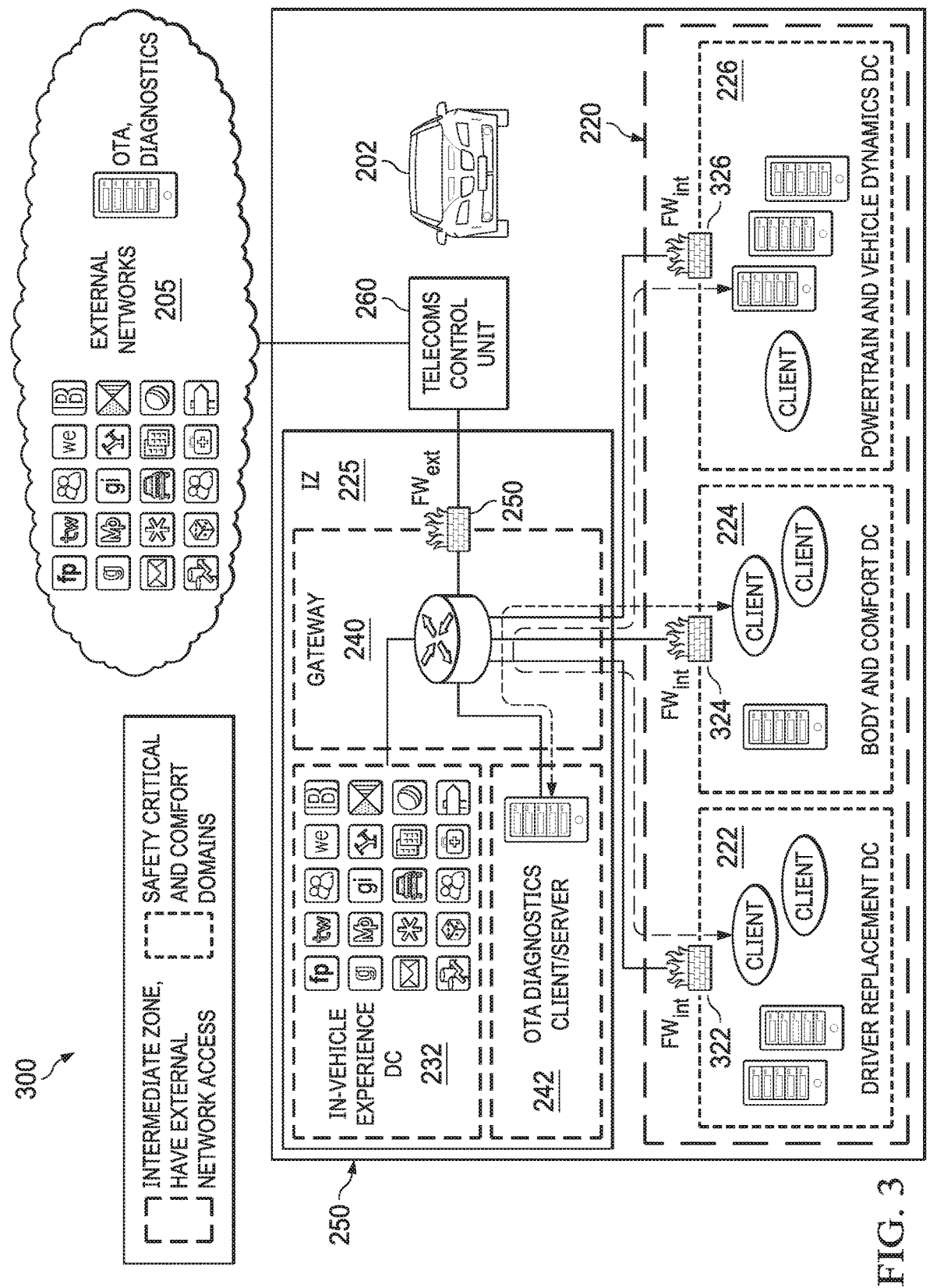
FIG. 3 is a schematic diagram showing another example implementation of inter-domain firewalling in an example vehicle network, according to an implementation.

FIG. 3 is a schematic diagram showing another example implementation of inter-domain firewalling in an example vehicle network 300, according to an implementation. As illustrated in FIG. 3, the trusted network 220 is connected to the gateway 240 of the IZ 225 directly, without the switch or router 210 in FIG. 2. In this case, each function domain can have an individual internal firewall, $FW_{int}$, to safeguard the traffic passing into the function domain. For example, an internal firewall, $FW_{int}$, 322 is placed between the driver replacement DC 222 and the gateway 240 of the IZ 225; an internal firewall, $FW_{int}$, 324 is placed between the body and comfort DC 224 and the gateway, $FW_{int}$, 324 of the IZ 225; and an internal firewall, $FW_{int}$, 326 is placed between the powertrain and vehicle dynamics DC 226 and the gateway 240 of the IZ 225.

Figure 4:
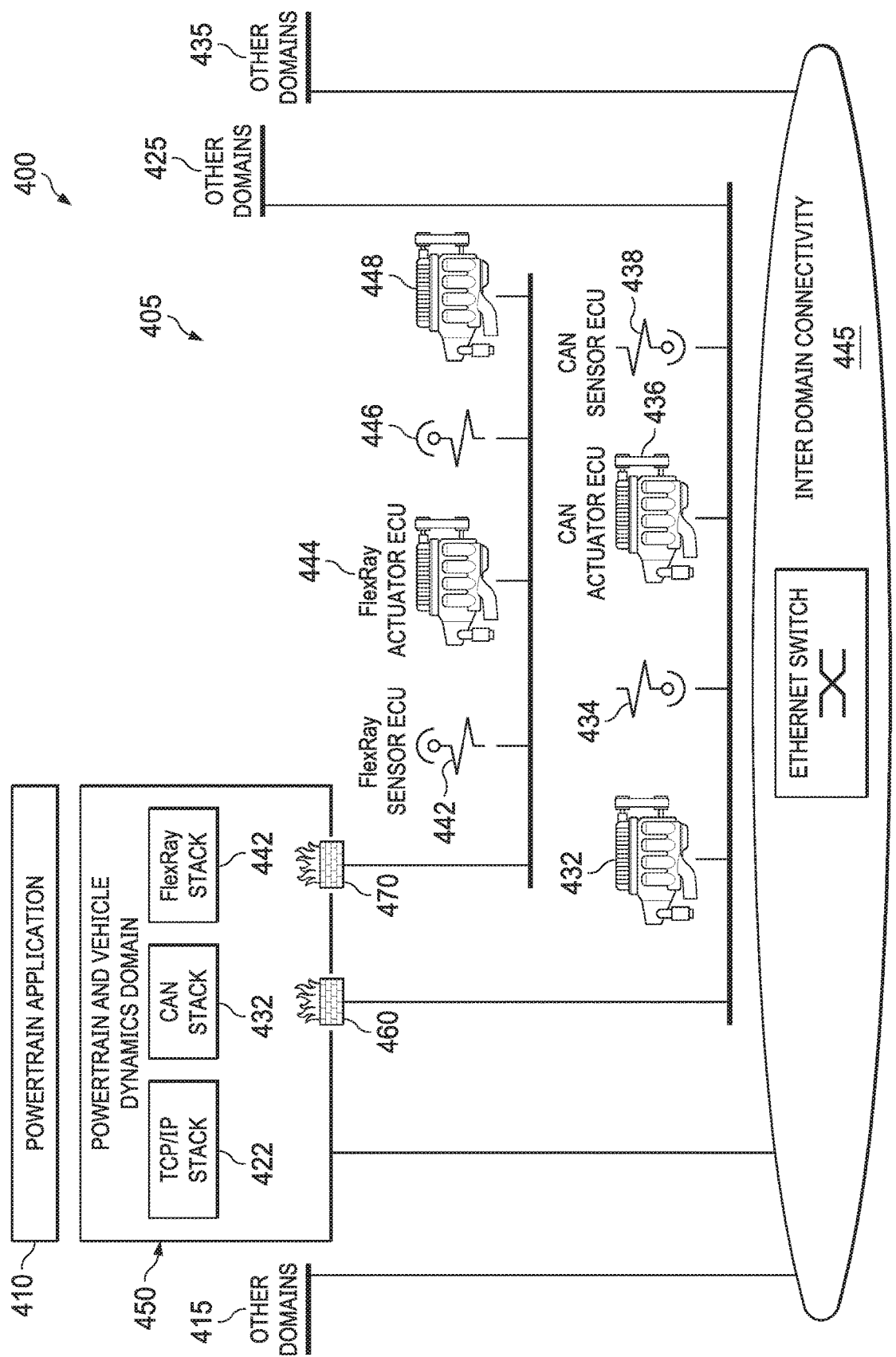
FIG. 4 is a schematic diagram showing an example implementation of intra-domain firewalling in a powertrain and vehicle dynamics domain of a vehicle network, according to an implementation.

FIG. 4 is a schematic diagram showing an example implementation 400 of intra-domain firewalling in a powertrain and vehicle dynamics domain 405 of a vehicle network, according to an implementation. The powertrain and vehicle dynamics domain 405 includes a powertrain and vehicle dynamics DC 450 that runs and supports powertrain applications 410. In the example, the powertrain and vehicle dynamics domain 405 is connected with other functional domains 415, 425, and 435 via an Ethernet switch 445 that provides inter-domain connectivity.

The powertrain and vehicle dynamics DC 450 can support communications based on different communication protocols such as TCP/IP stack 422, CAN stack 432, and FlexRay stack 443. For example, the powertrain and vehicle dynamics DC 450 can be connected to an Ethernet that includes the Ethernet switch 445 for inter-domain communication with other domains 415, 425, and 435. The powertrain and vehicle dynamics DC 450 can be connected with a CAN network that includes one or more actuator ECUs 432, 436 and sensor ECUs 434, 438 that support CAN communications. In some implementations, CAN is used, for example, for medium-speed (e.g., 1 Mbps) applications including ECU-to-ECU communications. The powertrain and vehicle dynamics DC 450 can also be connected with a FlexRay network that includes one or more sensor ECUs 442, 446 and actuator ECUs 444, 448 that support FlexRay communications. In some implementations, FlexRay is used for real-time, safety-critical applications. In some implementations, additional or different types of communications (e.g., Ethernet/IP, LIN, or MOST) can be used in the powertrain and vehicle dynamics domain 405. For example, LIN can be used for low-speed applications like sensors and actuators (e.g., with a data rate around 20 kbps).

In some implementations, for intra-domain firewalling, one or more firewalls can be placed on a DC of the functional domain or a gateway at the ingress/egress point of the functional domain. The example implementation of intra-domain firewalling shows locations of firewalls (e.g., firewalls 460, 470) implemented on the powertrain and vehicle dynamics DC 450. As illustrated, the firewall 460 is placed between the powertrain and vehicle dynamics DC 450 and the CAN network that connects the powertrain and vehicle dynamics DC 450 to the ECUs on the CAN network. The firewall 460 can be used to ensure that only authorized traffic passes between the powertrain and vehicle dynamics DC 450 and the ECUs on the CAN network. Similarly, the firewall 470 is placed between the powertrain and vehicle dynamics DC 450 and the FlexRay network that connects the powertrain and vehicle dynamics DC 450. The firewall 470 can be used to ensure that only authorized traffic passes from and into the ECUs based on FlexRay communication protocols.

Figure 5:
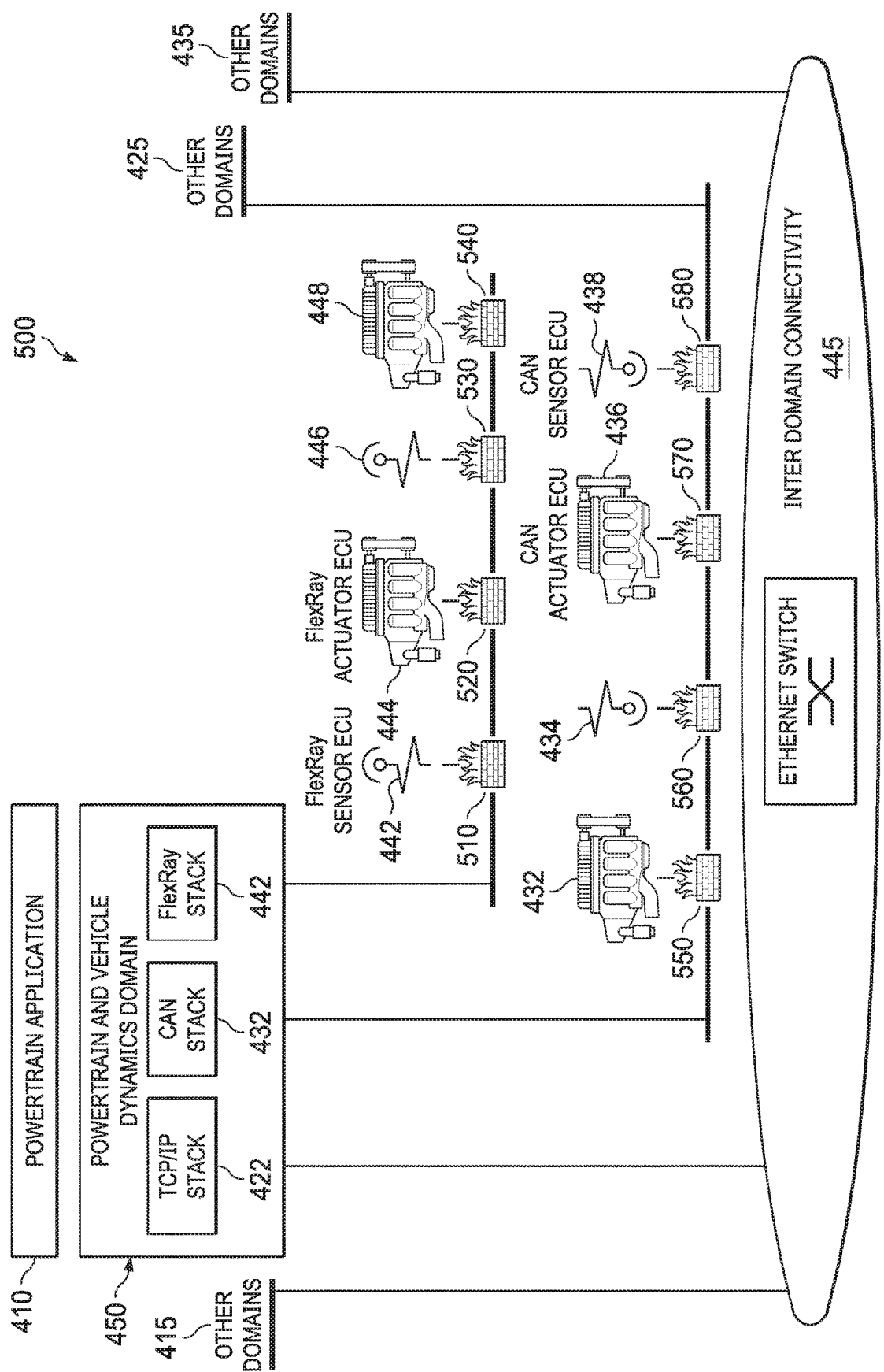
FIG. 5 is a schematic diagram showing another example implementation of intra-domain firewalling in the powertrain and vehicle dynamics domain of a vehicle network, according to an implementation.

FIG. 5 is a schematic diagram showing another example implementation 500 of intra-domain firewalling in the powertrain and vehicle dynamics domain 405 of a vehicle network, according to an implementation. Compared to the example implementation 400 in FIG. 4, the another example implementation 500 of intra-domain firewalling includes placing firewalls 510-580 at the egress/ingress point of the endpoints within the powertrain and vehicle dynamics domain 405. The endpoints can include, for example, sensor ECUs or actuator ECUs. As illustrated, FIG. 5 shows that the firewalls 510, 530, 520, and 540 are located at the egress/ingress points of the sensor ECUs 442, 446 and actuator ECUs 444, 448, respectively. Each of the firewalls 510, 530, 520 and 540 can safeguard traffic passing from and into the endpoints 442, 446, 444, 448 within the powertrain and vehicle dynamics domain 405 based on FlexRay communications. The firewalls 550, 570, 560, and 580 are located at the egress/ingress points of the actuator ECUs 432, 436 and sensor ECUs 434, 438, respectively. Each of the firewalls 550, 570, 560, and 580 can safeguard traffic passing from and into the endpoints 432, 436, 434, and 438 within the powertrain and vehicle dynamics domain 405 based on CAN communications. In some implementations, intra-domain firewalling within a functional domain of a trusted network can be implemented in another manner.

Figure 6:
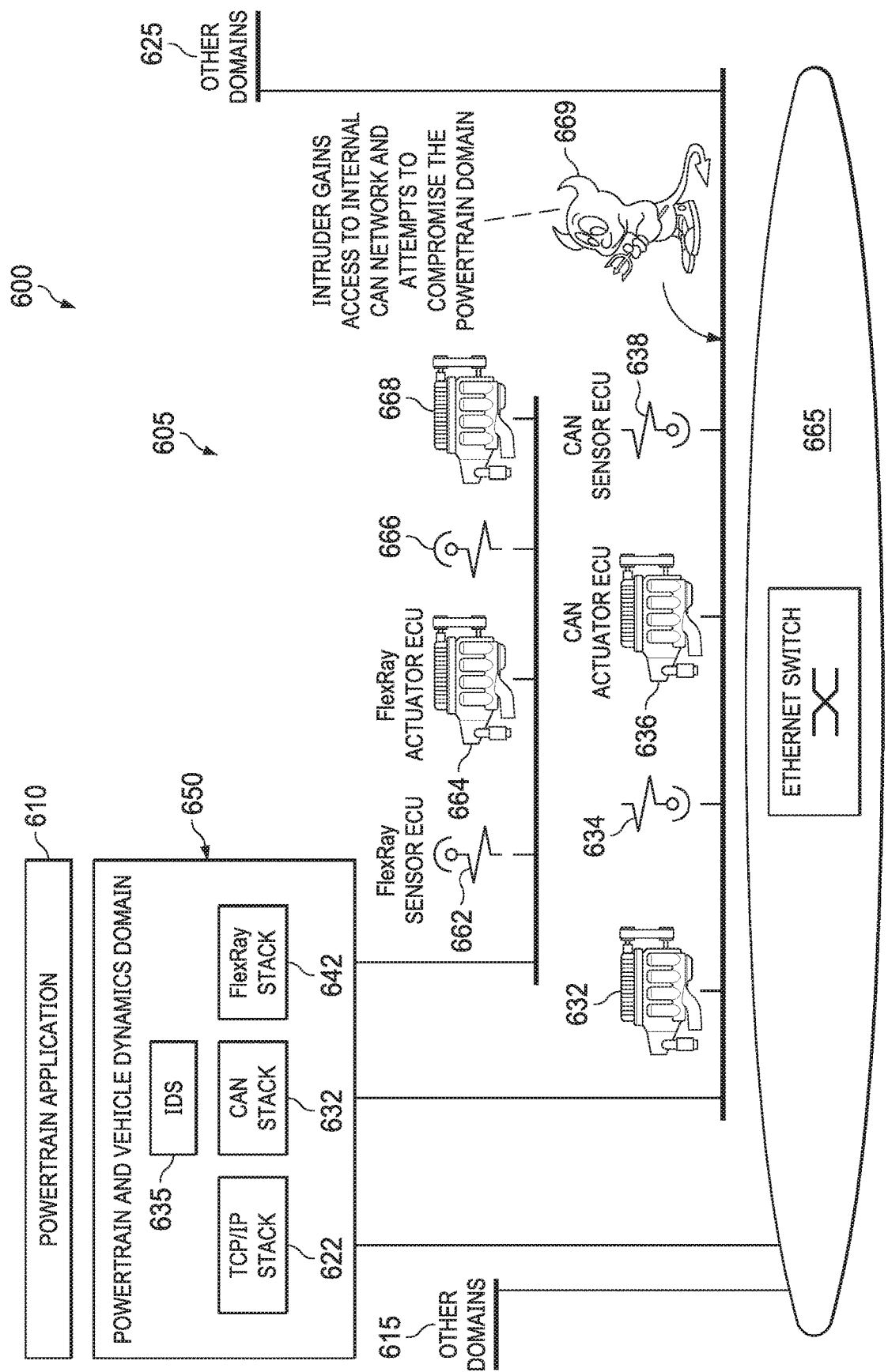
FIG. 6 is a schematic diagram showing an example implementation of intruder detection in the powertrain and vehicle dynamics domain of a vehicle network, according to an implementation.

FIG. 6 is a schematic diagram showing an example implementation 600 of intruder detection in the powertrain and vehicle dynamics domain 605 of a vehicle network, according to an implementation. In the example, the powertrain and vehicle dynamics domain 605 includes a powertrain and vehicle dynamics DC 650 that runs and supports powertrain applications 610. The powertrain and vehicle dynamics domain 605 is connected with other functional domains 615 and 625 via an Ethernet switch 665 that provides inter-domain connectivity.

The powertrain and vehicle dynamics DC 650 can support communications based on different communications protocols such as TCP/IP stack 622, CAN stack 632, and FlexRay stack 642. For example, the powertrain and vehicle dynamics DC 650 is connected to an Ethernet network including the Ethernet switch 665 for inter-domain communications with other domains 615 and 625. The powertrain and vehicle dynamics DC 650 can be connected with a CAN network including one or more actuator ECUs 632, 636 and sensor ECUs 634, 638 that support CAN communications. The powertrain and vehicle dynamics DC 650 can also be connected with a FlexRay network including one or more sensor ECUs 662, 666 and actuator ECUs 664, 668 that support FlexRay communications. In some implementations, FlexRay is used for real-time, safety-critical applications. In some implementations, additional or different types of communications can be used in the powertrain and vehicle dynamics domain 605. For example, LIN can used for low-speed applications like sensors and actuators (e.g., with a data rate around 20 kbps).

The powertrain and vehicle dynamics DC 650 includes an intruder detection system (IDS) 635. As shown in FIG. 6, in some instances, an intruder 669 may gain access to the internal CAN network and attempt to compromise the powertrain and vehicle dynamics domain 605. The IDS 635 can be used for intruder detection. For example, the IDS 635 can identify a data frame that is unexpected (e.g., one with message identity that does not appear within the identified connectivity information based on code analysis). In some implementations, the IDS 635 may generate a log and/or a report which is transmitted to a cloud server to record any intrusion, unexpected data frame, or any other abnormal information.

Figure 7:
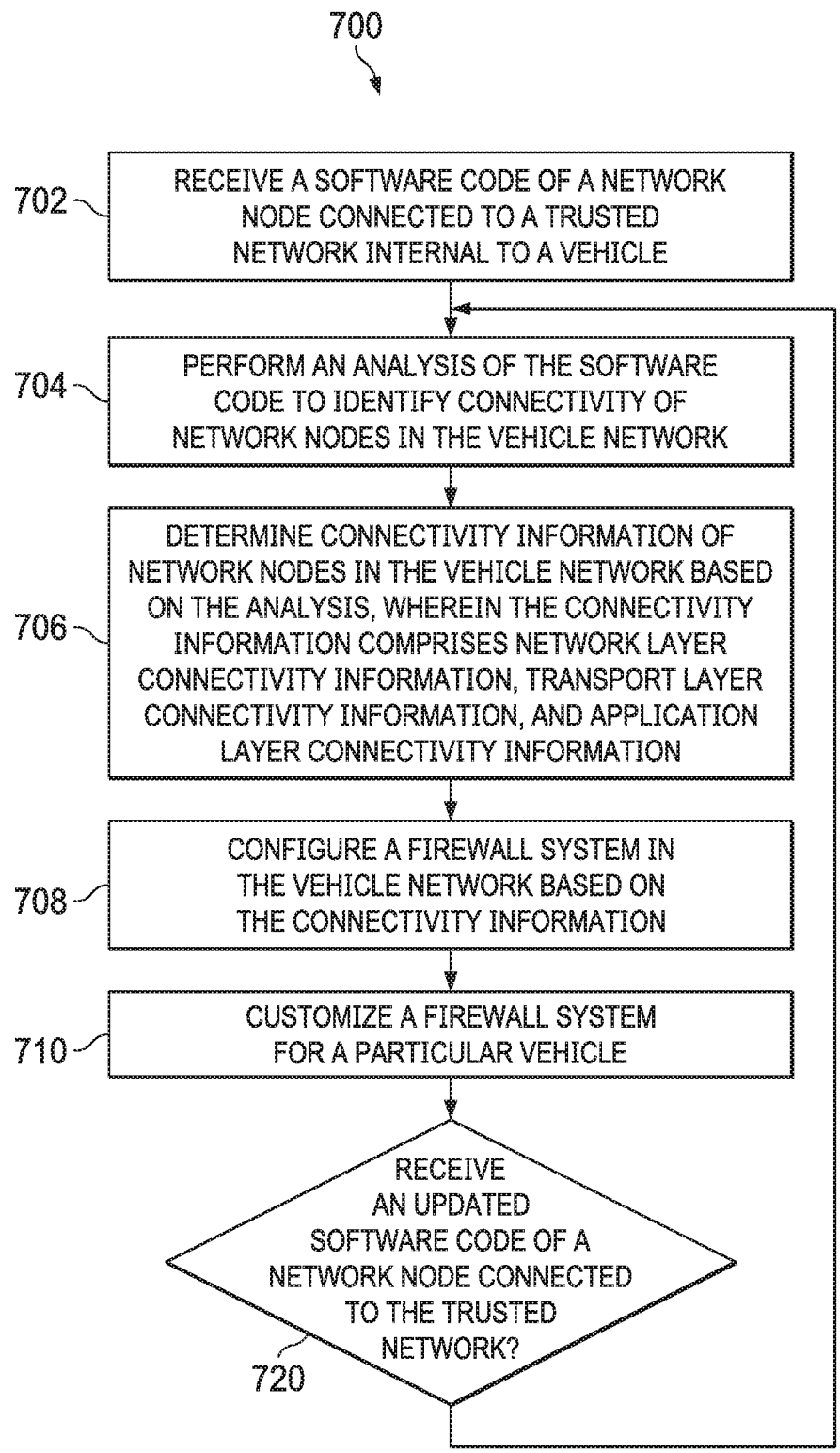
FIG. 7 is a flow diagram showing an example method for configuring a firewall system in a vehicle network, according to an implementation.

FIG. 7 is a flow diagram showing an example method 700 for configuring a firewall system in a vehicle network, according to an implementation. The vehicle network can include a number of network nodes such as gateways, DCs, ECUs, sensors and actuators. FIGS. 1 and 2 show example vehicle networks 100 and 200, respectively. In some implementations, the vehicle network can be configured in another manner. In some implementations, the vehicle network can include a trusted network internal to a vehicle (e.g., trusted network 220) and an untrusted network external to the vehicle (e.g., external networks 205). The trusted network can include one or more functional domains for controlling functionalities of the vehicle. In some implementations, the vehicle network can further include an intermediate zone (e.g., IZ 225) that is neither fully untrusted, nor fully trusted. The IZ can be internal to the vehicle.

The method 700 can be performed by data processing apparatus (e.g., at least one hardware processor). The data processing apparatus can be a network code in the vehicle network, e.g., a DC or an ECU; or the data processing apparatus can be a computer remote from the vehicle network. The method 700 shown can also be implemented using additional, fewer, or different entities. Furthermore, the method 700 can be implemented using additional, fewer, or different operations, which can be performed in the order shown or in a different order. In some implementations, the method 700 can be a hybrid process performed by a machine and a human. For example, some of the operations of the method 700 can be performed by a human (e.g., a security engineer) or be performed by data processing apparatus based on human input or interactions.

The example method 700 begins at 702, a software code of a network node connected to the trusted network internal to the vehicle is received. In some implementations, software codes of two or more network nodes connected to the trusted network internal to the vehicle are received. Ideally, all software codes of all network nodes in the trusted network internal to the vehicle can be gathered for analysis.

In some implementations, some software codes of multiple network nodes in the trusted network internal to the vehicle are received for analysis.

In some implementations, the software code can include one or more of an application source code, application assembly code, application binary code, configuration file, or manifest file. For example, the application binary code can also be referred to as an object code or compiled code. The binary code that is analysed can be a linked set of object codes. The configuration file can be read in by the application code (e.g., application source code, application assembly code, and application binary code). The configuration file can include a variety of information that might be required by the application, for example, parameter settings, constants, networking addresses, filenames and their locations. The manifest file provides additional information for deployment of the software code on the platform. The manifest files can be used, for example, for machine/platform configuration, application configuration and sandboxing, and configuring communications.

The network node connected to the trusted network internal to the vehicle can include, for example, a gateway node, a DC of a functional domain, a ECU, or another type of electronic device that is at the ingress/egress point, within, or otherwise connected to the trusted network internal to the vehicle. The one or more functional domains can include one or more of an in-vehicle experience domain, powertrain and vehicle dynamics domain, driver replacement domain, or body and comfort domain.

In some implementations, the trusted network internal to the vehicle can include a network on one or more of an automobile, motorbike, train, maritime transport, or airplane. In some implementations, the trusted network includes one or more of Ethernet, Controller Area Network (CAN), FlexRay, Media Oriented System Transport (MOST), or Local Interconnected Network (LIN).

At 704, an analysis of the software code is performed to identify connectivity of the network nodes in the vehicle network. In some implementations, performing the analysis of the software code includes performing one or more of a static analysis or a dynamic analysis of the software code.

In some implementations, performing the static code analysis includes determining one or more of: a server software, client software, communication protocol type, communication source address, communication destination address, application content type, application layer address, or dynamic assignment of a communication parameter.

For example, with respect to configuring firewalls for inter-domain communications (e.g., as described with respect to FIGS. 2 and 3), In some implementations, the static code analysis includes analysing all, or as much as possible, of the code in the trust network (e.g., the trust network 220 in FIGS. 2 and 3). Optionally, the static code analysis can include analysing any code in the IZ (e.g., stable code in services such as the OTA software update server).

Note that the quality of the firewall configuration can improve as the number of domains that are collectively analysed is increased, since it will be possible to capture both the client side and server side aspects of the communication, where the client and server reside in different domains. For example, a client on a Driver Replacement domain may need to send a message to a server on the Powertrain domain, where the content of the message is to request an acceleration of the vehicle. By performing binary scanning on both the powertrain domain and the driver replacement domain it is possible to identify both client and server processes in each domain. This means that, for example, when configuring the firewall IP table at the ingress/egress point of each domain it is possible to define both allowed source and destination parts of the communication flow.

In some implementations, because the firewall configuration improves as the number of considered software codes increases, the described techniques may be better amenable to binary code based scanning, since within a vehicle there may be a large variety of software vendors and hence a variety of source code languages and software development approaches/platforms are in use. The described techniques could also work where source code scanning or other types of code analysis is deployed.

The static code analysis can produce connectivity information for multiple network types used within the vehicle, such as Ethernet, Controller Area Network (CAN), FlexRay, Media Oriented System Transport (MOST), or Local Interconnected Network (LIN).

In some implementations with respect to configuring firewalls for intra-domain communications, the firewall can be applied at all connections from the DC (e.g., as described with respect to FIG. 4) to intra-domain networks. In some implementations, static code analysis is performed on the application code within the DC and also on the application code within the ECUs that are connected to the networks that are themselves connected to the DC. In this way, servers and clients can be identified throughout the functional domain in such a way that both sources and destinations for communication flows are identified. For example, for the intra-domain firewalling implemented on the DC 450 as shown in FIG. 4, static code analysis can analyse some or all software codes of the network nodes in the powertrain and vehicle dynamics domain 405 to determine connectivity information. For example, it would be ideal to analyse all domain controller software of the DC 450, sensor software of sensor ECUs 432, 436, 442, and 446, and actuator software of actuator ECUs 434, 438, 444, and 448. This makes it possible to determine all ingress/egress packet flows from/to the DC 450 for each of the intra domain local area networks (CAN and FlexRay) in the example shown in FIG. 4.

In some implementations with respect to configuring firewalls for intra-domain communications, the firewall can be applied at all connections from the ECU endpoint (e.g., as described with respect to FIG. 5) to the intra-domain network, the static code analysis can be performed on the application code within the DC and also on the application code within the ECUs that are connected to the networks that are themselves connected to the DC. In this way, servers and clients can be identified throughout the domain, in such a way that both sources and destinations for communication flows are identified.

In some implementations, performing a dynamic analysis of the software code includes performing a port scan or a packet sniffing to determine connectivity paths. Packet sniffing can also be used to troubleshoot network problems or to gather network statistics. The software or device used for capturing packet data can be referred to as a packet sniffer, packet analyzer, network sniffer or simply network analyzer. Packet sniffing can be performed to capture network traffic (e.g., at the frame level) and derive network information by analysing the captured packets or frames (e.g., according to certain frame structure and/or traffic statics). For example, in addition to or as an alternative to static code analysis, dynamic analyses can be performed when one or more of an application code, configuration file, or manifest file is deployed and executed on a vehicle network or platform.

Examples of methods of dynamic analyses include, for example, turning off all firewalls and performing a port scan. In this test it is possible to determine what servers within the application are listening for messages. In the example case of IP based connectivity, the IP address, protocol type, and port number of the listening services can be recorded. In some implementations, a dynamic analysis includes turning off all firewalls and exercising the various software states of the vehicle using a packet sniffing application to record connectivity used (source and destination addresses, etc.).

In some implementations, dynamic analysis can be performed for exercising the software states of the vehicle in one or more of the following example environments: (a) where all the codes are deployed in the vehicle and the vehicle is driven around to execute software features; (b) where the relevant ECU's, DCs, and interconnecting wiring loom are constructed on a bench/wall. All codes are deployed to ECUs and DCs. Executing the software features to ascertain connectivity used in a wide range of conditions may be simulated by injection of appropriate messages or by switching ECUs into certain states.

In some implementations, an application code can be deployed to all vehicle platforms (e.g., domain controllers, ECUs, clients/servers within an IZ, etc.). In some implementations, an application code can be deployed on a subset of platforms in the vehicle, particularly where that subset is self-contained from a communication point of view (i.e., when no platforms within the subset need to communicate with any platforms outside of the subset). The application code (and any other type of code on the device) may be running when the dynamic analysis is performed. For example, the dynamic analysis can be performed when the vehicle is being operated (e.g., on the road such as on a track, rolling road or bench).

In some implementations, performing a dynamic analysis of the software code includes performing an analysis based on the monitored software states of the vehicle. For example, the software states of the vehicle can be measured, monitored, or otherwise obtained by one or more processors in the vehicle. For example, the dynamic analysis software in the vehicle can be monitoring aspects such as which types of packet are on the network, and where are they going from and to, or which servers are active, etc. The dynamic analysis could also include monitoring memory resource usage, privilege levels being used by code, etc. In some implementations, the monitored software states of the vehicle can be transmitted to a cloud server and the cloud server is equipped with dynamic analysis software for performing the dynamic analysis of the software codes in the vehicle based on the monitored software states of the vehicle.

At 706, connectivity information of the nodes in the vehicle network is determined based on the analysis. In some implementations, the connectivity information includes the connectivity information obtained based on one or more of a static code analysis or a dynamic code analysis. As an example, the connectivity information can include at least one of Network Layer connectivity information, Transport Layer connectivity information, or Application Layer connectivity information. In some implementations, the Network Layer connectivity information includes one or more of a type of a Network Layer protocol, a source address pursuant to the type of the Network Layer protocol, a destination address pursuant to the type of the Network Layer protocol, or a type of dynamic address allocation pursuant to the type of the Network Layer protocol. In some implementations, the Transport Layer connectivity information includes one or more of a type of Transport Layer protocol, a source address pursuant to the type of the Transport Layer protocol, or a destination address pursuant to the type of the Transport Layer protocol. In some implementations, the Application Layer connectivity information includes one or more of a type of an Application Layer protocol, a source address pursuant to the type of the Application Layer protocol, a destination address pursuant to the type of the Application Layer protocol, and a type of Service-Oriented or non-Service-Oriented connectivity, or one or more of used Uniform Resource Locators (URLs).

For example, for an IP network (e.g., Ethernet), a static code analysis can produce IP based connectivity, including one or more of the below connectivity information: (a) Layer 1 (Physical Layer) connectivity that indicates physical layer technology used for providing the connectivity (e.g., Ethernet); (b) Layer 2 (Medium Access Control (MAC) Layer) connectivity that indicates Layer 2 protocol type (e.g., IEEE 802.3), and/or source and destination addressing (e.g. MAC addresses); (c) Layer 3 (Network Layer) connectivity that indicates Layer 3 protocol type (e.g., IP), source and destination addressing (e.g., IP address of source and destination), and/or use of dynamic IP address allocation (e.g., DHCP, DNS, stateless auto configuration); (d) Layer 4 connectivity (Transport Layer) that indicates Layer 4 protocol type (e.g., TCP, UDP), and/or source and destination addressing (e.g., port number of source and destination); (e) Application layer connectivity that indicates data format (e.g., XML or HTML), Use of Service Oriented connectivity (e.g., SOME of SOME/IP), Application layer addresses, and/or URLs used; (0 whether a particular code having connectivity requirements is acting as a server or as a client.

FIG. 8 is a plot 800 showing example types of information that a static code analysis can identify to determine Layer 3 and Layer 4 connectivity of an example vehicle network, according to an implementation. The plot 800 illustrates an example of IP-based connectivity based on a TCP/IP C-code example. The static code analysis can be performed, for example, by a code scanner executing on data processing apparatus. For readability the figure illustrates the concept using source code but the same principles can be applied where scanning of binary code or other types of codes is employed.

As illustrated, at 810, the source code scanner can identify the inclusion of IP communication libraries and determine that the connectivity includes an IP-based connectivity. At 820, the source code scanner can identify that the inclusion of "AF-INET" and "SOCK_Stream" indicates the use of the TCP protocol (a Layer 4 protocol) over the IP protocol (a Layer 3 protocol) in the vehicle network. At 830, the code scanner can identify a destination IP address of a server. At 840, the code scanner can identify a port number (Layer 4 addressing) that indicates HTTP. At 850, the code scanner can identify that the inclusion of command "send" indicates that the software code is acting as a client. At 860, the source code scanner can identify that the inclusion of command "recv" indicates that the software code is acting as a server.

FIG. 9 is a plot 900 showing example types of information that a static code analysis can identify to determine expected application content type of an application layer in use in a communication over an example vehicle network, according to an implementation. The plot 900 illustrates an example of IP-based connectivity based on a HTTP/TCP/IP C-code example. The static code analysis can be performed, for example, by a binary code scanner executing on data processing apparatus, noting that source code is shown here for the purposes of more easily illustrating the concept.

As illustrated, at 910, the code scanner can analyse the code of all permutations of how a particular variable (e.g., msg_to_send, that is used in sending data) is created and with what values (e.g., in this example it is determined that the variable is populated with content of an XML file). At 920, the code scanner can analyse the code to determine where a particular variable (e.g., msg_recv) is checked for the purposes of receiving data, for example, it could be determined that the variable is set by a content checking routine such as those used in known libraries (e.g., CURL). It could then be determined that the received content is expected to be of type XML. Using this information it would be possible to configure a firewall to check that communications over certain paths carry application layer content in the format expected, and where this is not the case the firewall can block the flow.

Referring back to FIG. 7, as another example, for a CAN network a static code analysis can determine connectivity of the vehicle network, including one or more of below connectivity information: (a) Use of CAN Physical layer; (b) Ability of software to send Data Frames, which can include Message Identity(s) of allowed Data frames; (e) Ability of software to send Remote Frames (and thereby trigger other nodes to send Data Frames), which can include Message Identity used in a Remote Frame (which corresponds to the Message Identity of the Data Frame that the endpoint wishes to receive); (d) Message Filter(s) applied by the software, which describes the set of Message Identity(s) that the processor will be looking for on a CAN Bus and which if present in a message will be passed up to the application layer for processing, or (e) Application layer content.

In some implementations, a firewall controlling access onto or off the CAN Bus will use this information to ensure that only ingress and egress messages to or from a particular node that are compliant with this connectivity information (e.g., that are compliant with the whitelist) are allowed to pass to/from the CAN Bus.

Similar to the case of IP connectivity, this connectivity information can be identified from a scan of the code by searching for instructions which result in a call to the CAN network driver software and by identifying parameters in the function call. Such parameters may be passed to the CAN network driver. Such parameters in the function call may include the Message Identity or Remote Transmission Request (RTR) setting.

In some implementations, following analysis (either static code analysis or dynamic analysis), the connectivity information can be recorded. For example, the connectivity between processors could be documented in a table, a figure, or in another data structure or format. Table 1 below shows an example recording of example inter-domain connectivity information based on unicast IP/Ethernet communications.

As another example, Table 2 below shows an example recording of example intra-domain connectivity information based on CAN communications, where nodes on the CAN include DCs and ECUs, for example, as shown in FIG. 5. In some implementations, a CAN can include one or more client nodes and server nodes. A client node can generate a Remote Frame, where the Remote Frame requests that the node that supplies a CAN message with a certain Message Identity responds by placing such a CAN message on the CAN bus. The server node can generate a Data Frame including the requested Message Identity. For a given Message Identity, there may or may not be a client node. That is, there may or may not be another node which generates a Remote Frame with that Message Identity.

TABLE 1

Example recording of an example inter-domain interconnectivity for IP/Ethernet

| | |
|---|---|
| Domain #1 involved in the communication | Powertrain and vehicle dynamics |
| Domain #2 involved in the communication | Driver replacement |
| Server domain | Powertrain and vehicle dynamics |
| Client domain | Driver replacement |
| Layer 1 protocol | Ethernet |
| Layer 2 protocol | Ethernet MAC |
| Layer 2 address of server | 00-1B-2F-BB-4C-98 (hex) |
| Layer 2 address of client | 00-1B-2F-BB-4C-99 (hex) |
| Layer 3 protocol | IP |
| Layer 3 address of server | 10.242.16.1 |
| Layer 3 address of client | 10.242.16.3 |
| Layer 4 protocol | TCP |
| Layer 4 address of server | 80 |
| Layer 4 address of client | 80) |
| Application protocol data format | XML |

TABLE 2

Example recording of an example CAN connectivity

| | |
|---|---|
| Server node (or application software identity) | ECU# 12 |
| Client node (or application software identity) (if present) | Powertrain and vehicle dynamics Domain Controller |
| Layer 1 protocol | CAN |
| Message identity | 50 (hex) |

At 708, a firewall system of the vehicle network is configured based on the connectivity information. In some implementations, configuring a firewall system of the vehicle network includes configuring one or more firewalls in the vehicle network based on the connectivity information (e.g., the connectivity information recorded in Table 1 or 2). In some implementations, configuring one or more firewalls in the vehicle network based on the connectivity information includes configuring a firewall (e.g., on a gateway node, a DC, or another node) in the vehicle network to secure intra-domain communications, inter-domain communications, or both.

In some implementations, configuring one or more firewalls in the vehicle network based on the connectivity information includes configuring a firewall on a domain controller (DC) of the one or more domains in the vehicle network to perform inter-domain firewalling to secure inter-domain communications. (e.g., according to the techniques described with respect to FIG. 4).

In some implementations, configuring one or more firewalls in the vehicle network based on the connectivity information includes configuring a firewall on a DC of one domain in the vehicle network to perform inter-domain firewalling to secure inter-domain communications. In some implementations, configuring one or more firewalls in the vehicle network based on the connectivity information includes configuring a firewall on an endpoint within the domain in the vehicle network to secure intra-domain communications.

For example, based on a set of records of the connectivity information shown in Table 1, a firewall can be configured to determine what communications are allowed into and out of each domain. In some implementations, a per domain firewall configuration can be configured to include a set of connectivity information that includes a whitelist of allowed connectivity between network nodes. In some implementations, the per domain firewall configuration can be applied at a firewall at the ingress/egress point of each domain (e.g., the firewall $FW_{int}$ as shown in FIG. 3) or it could be applied at a centralised firewall (e.g., the firewall $FW_{int}$ in a gateway as shown in FIG. 2).

As an example to configure a per domain firewall configuration, say, of the powertrain and vehicle dynamics domain (as shown in FIGS. 2 and 3), the firewall can be set up to blacklist or block all communications. Then for each allowed connectivity on the whitelist (e.g. see items in Table 1) that has the powertrain and vehicle dynamics domain as either Domain #1 or Domain #2, a firewall rule can be created to let such connections pass and to block any communications that do not fall within this whitelist set. Such configurations can typically be done, for example, in the case of internet communications, by setting a row in the Firewall IP table for each connection, for example, as shown in Table 3 below.

TABLE 3

Example IP-Table-based firewall configuration
Table 9.5 Sample Packet Filter Firewall Request

| | Source Address | Source Port | Dest Address | Dest Port | Action |
|---|---|---|---|---|---|
| 1 | Any | Any | 192.168.1.0 | >1023 | Allow |
| 2 | 192.168.1.1 | Any | Any | Any | Deny |
| 3 | Any | Any | 192.168.1.1 | Any | Deny |
| 4 | 192.168.1.0 | Any | Any | Any | Allow |
| 5 | Any | Any | 192.168.1.2 | SMTP | Allow |
| 6 | Any | Any | 192.168.3 | HTTP | Allow |
| 7 | Any | Any | Any | Any | Deny |

In some implementations, configuring one or more firewalls in the vehicle network based on the connectivity information includes generating a file detailing a firewall configuration. For example, the file can include the firewall configurations such as a whitelist of allowed connectivity, a backlist of prohibited connectivity, or any other information. As an example, the file can include the firewall configurations as shown in Table 3.

In some implementations, configuring a firewall system of the vehicle network based on the connectivity information includes configuring one or more firewalls in the vehicle network based on the connectivity information determined by the analysis of the code (e.g., a static and/or dynamic code analysis) in combination with connectivity information as planned or expected by the original system design. In some implementations, the process of configuring one or more firewalls in the vehicle network based on the connectivity information includes generating or otherwise provisioning a file detailing differences between the determined connectivity information of the vehicle network and a designed connectivity of the vehicle network.

In some implementations, configuring a firewall system of the vehicle network based on the connectivity information includes configuring a firewall system by a human (e.g., a security engineer) or based on human input or interactions with data processing apparatus. For example, the firewall system can be configured by a human by manually setting up, modifying, or otherwise configuring one or more parameters of the firewall system of the vehicle network based on the connectivity information. For example, the file detailing differences between the determined connectivity information of the vehicle network and a designed connectivity of the vehicle network can be provisioned to a security engineer to put the final configuration together.

Figure 10:
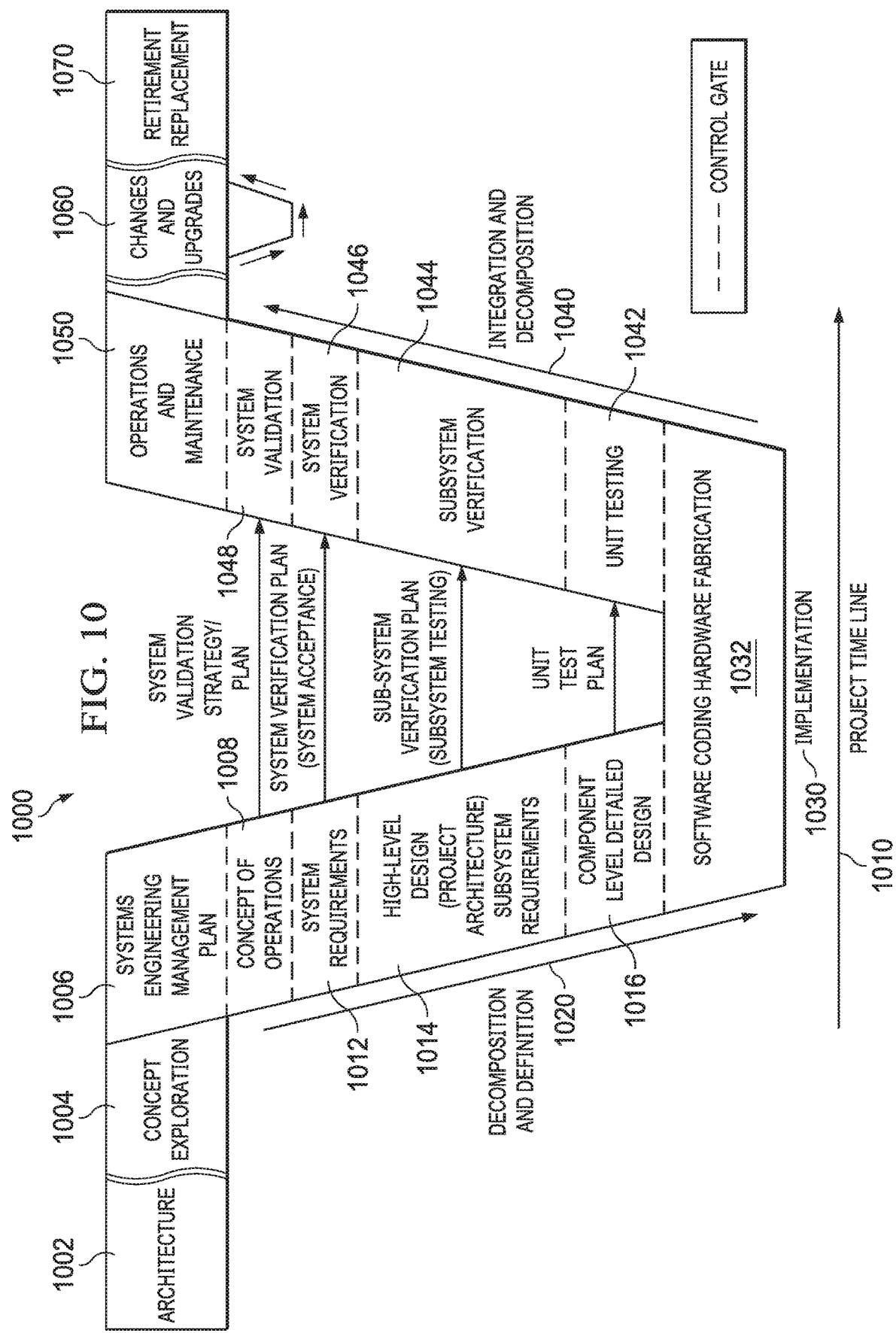
FIG. 10 is a schematic diagram showing an example system engineering waterfall diagram, according to an implementation.

FIG. 10 is a schematic diagram showing an example system engineering waterfall diagram 1000, according to an implementation. As illustrated, along a project timeline 1010, a system (e.g., a vehicle) engineering project can include multiple phases or stages. For example, the project can start from architecture 1002 and concept exploration 1004, via decomposition and definition 1020, implementation 1030, integration and recomposition 1040, operations and maintenance 1050, and changes and updates 1060, to retirement and/or replacement 1070.

The decomposition and definition 1020 can further include a system engineering management plan 1006, concept of operations 1008, system requirement 1012, high-level design (project architecture) subsystem requirements 1014, and component-level detailed design 1016. The implementation 1030 can include software coding and hardware fabrication 1032. The integration and recomposition 1040 can further include unit testing 1042, subsystem verification 1044, system verification 1046 and system validation 1048.

In some implementations, the connectivity information determined by the analysis of the code (e.g., a static and/or dynamic code analysis) can be used during the system verification phase 1046 as shown in FIG. 10. The determined connectivity information can be compared with what is expected based on the system requirement 1012 or the high-level design (project architecture) subsystem requirements 1014. In some implementations, differences between the determined and expected connectivity information can be made available in a file or on a GUI to, for example, engineers or other technicians responsible for integration and recomposition 1040 (e.g., system verification 1046, and system validation 1048) and/or cybersecurity.

In some implementations, configuring one or more firewalls in the vehicle network based on the connectivity information includes providing a firewall advisory of firewall configuration, for example, to engineers or other technicians responsible for systems integration and recomposition 1040 (e.g., system verification 1046, and system validation 1048) and/or cybersecurity. For example, the connectivity identified at system design and connectivity identified by (static code and/or dynamic) analysis can be combined or integrated to build a connectivity superset. As an example, all connectivity identified in this superset can then be used in building the whitelist that is deployed to the firewall.

In some implementations, the advisory could be presented on a GUI. Additionally or alternatively it can include a draft firewall configuration. If there are some aspects of connectivity which could not be fully determined through code analysis, or if there was some code that could not be analysed, then warnings or flags could be provided to highlight these issues or missing information. In some implementations, the method 700 can include providing a warning of a failure to obtain connectivity information of a network node in the vehicle network based on the analysis. For example, if a port scan showed that a service was listening on a particular port, but it had not been determined which client IP addresses are allowed to access that server, then this could be flagged. In this case, potentially the part of the firewall that determines aspects of the client side of the communication could be set "open" in such a way that any client side IP address could access the server. Such default behaviour that results in "opening" of connections in the first draft firewall configuration could be flagged.

In some implementations, configuring a firewall system of the vehicle network includes performing intrusion detection based on the connectivity information to detect intruders or anomalies. As an example, the firewall system can include an intrusion detection system (IDS, such as the IDS 635 shown in FIG. 6), which can be used to detect any attempted communications which are not listed in the connectivity information records that are gathered by static code analysis or by dynamic analysis and the firewall system can take actions accordingly. In some implementations, intrusion detection is performed when the vehicle is operational. For example, a piece of software in the vehicle may spot a possible intrusion and then either triggers the taking of action in the vehicle and/or reporting of the possible intrusion to a cloud server.

In some implementations, performing intrusion detection includes identifying a packet that is not in a whitelist based on the determined connectivity information of the vehicle network; logging characteristics of the identified packet that is not in the whitelist; and reporting to a server the characteristics of the identified packet that is not in the whitelist.

An example of an IDS for CAN is shown in FIG. 6. In this case the IDS 635 is hosted on the DC 650 that monitors activity on a CAN bus. The IDS 635 can compare Message identities in Remote Frames and Data Frames of messages that are sent on the CAN Bus with a whitelist (e.g., determined by static code analysis and/or dynamic analysis) of allowed Remote Frames and Data frames that are allowed on the CAN Bus. Then, when a Remote Frame or Data Frame that is not compliant with the whitelist is detected, the IDS can take certain actions. For example, the IDS can log the non-compliance including details of packet type detected, packet field settings, time of detection, etc. Optionally, at some later point in time, this log may be reported to a server on a network that is external to the vehicle or it may be read by some diagnostic tool (e.g., over ODBII). In some implementations, the IDS may immediately report the non-compliance, for example, to a server in the network.

In some implementations, the IDS can take one or more immediate actions. For example, in the CAN case, the IDS can de-activate the node (e.g., ECU) or software process that is being targeted with unexpected Remote Frames. Additional or different actions may be taken in response to the detection of an intrusion.

In some implementations, the IDS 635 on the DC 650 that may be co-located with a firewall, can monitor, for whitelist compliance, all communications on the bus (not just those communications that pass through the domain controller firewall). In another example, an IDS may detect an intruder or anomaly when a packet gets blocked by the firewall (does not appear on the whitelist).

In some implementations, the firewall configurations can be verified by a verification test. For example, once the firewall configurations have been derived, they can be tested by deploying them to one of the environments described above for dynamic analyses (e.g., either to the complete vehicle or to the test bench mounted system). The car software can be then executed according to one of the techniques described with respect to the dynamic analyses. Then, a process within the firewall system (e.g., the intrusion detection) can record whether any packets are blocked from getting through. The information regarding what packets were blocked (especially for example Layer 2, Layer 3, Layer 4, Application level information) can be returned to, for example, security engineers or other personnel who can take it into account in considering whether to provide a revised firewall configuration.

At 710, the firewall system is customized for a particular vehicle. In some implementations, the automated firewall configuration and intruder detection system, configuration as described with respect to 702-708, can be performed for different vehicles. Different firewall systems with different firewall and IDS configurations might be produced as a function of a model category, where the category can be, for example, a low end, mid-tier, sport, high tier, estate, saloon. In some implementations, functionalities and features of a vehicle can increase in number or be improved as the tier of the model type increases. In some implementations, different options can result in a different set of ECUs and/or application software being installed.

In some implementations, different firewall and IDS configurations can be produced as a function of a specific set of options or features that are selected for a particular (e.g., single) vehicle by a particular customer. In some implementations, different options or features can result in a different set of ECUs and/or application software being installed in the vehicle. In some implementations, the automated production of firewall configuration and intruder detection system configuration could be integrated into the vehicle production process. For example, one of the vehicle production actions that is triggered from the customer order is to perform the static code analysis, which can result in production of firewall and IDS configurations specific for the particular vehicle. This firewall and IDS configurations can then be installed during manufacture of the vehicle. Additionally or alternatively, an aftermarket component may be added to a vehicle. In this case, the described static code analysis processes can be performed to provide the vehicle with an updated firewall and intruder detection system configuration.

In some implementations, in the above processes, if a particular piece of code (e.g., identified by an application ID) has already been scanned to determine its connectivity information, the pre-determined connectivity information results can optionally be accessed from memory.

At 720, whether an updated software code of a network node connected to the trusted network is received is determined. Upon receiving the updated software code, the example method 700 can go back to 704 for performing an analysis of the updated software code to identify connectivity of the network nodes in the vehicle network. The example method 700 can further proceed to 707 for determining updated connectivity information of the network nodes in the vehicle network based on the analysis; to 708 for updating configurations of the one or more firewalls in the vehicle network based on the updated connectivity information, and so on.

In some implementations, new firewall configurations or IDS configurations can be deployed to the vehicle at the same time as the OTA software update. This is because the new software may add new connectivity or take away old connectivity. In some implementations, at the same time that a binary scan of a new software load is performed, a new firewall configuration may also be produced. This might optionally be compared with the old firewall(s) configuration so that a determination can be made as to whether the newly derived firewall(s) configuration needs to be pushed to the car.

In some implementations, alternatively or additionally, the complete, newly derived firewall(s) configuration can be sent to the car with every OTA update. Differential firewall configurations may also be applied, and this might include only pushing firewall configuration updates to nodes in which the firewall configuration has changed (as opposed to pushing updates to all nodes which host firewalls) and/or only pushes additions/deletions to the firewall configuration.

Figure 11:
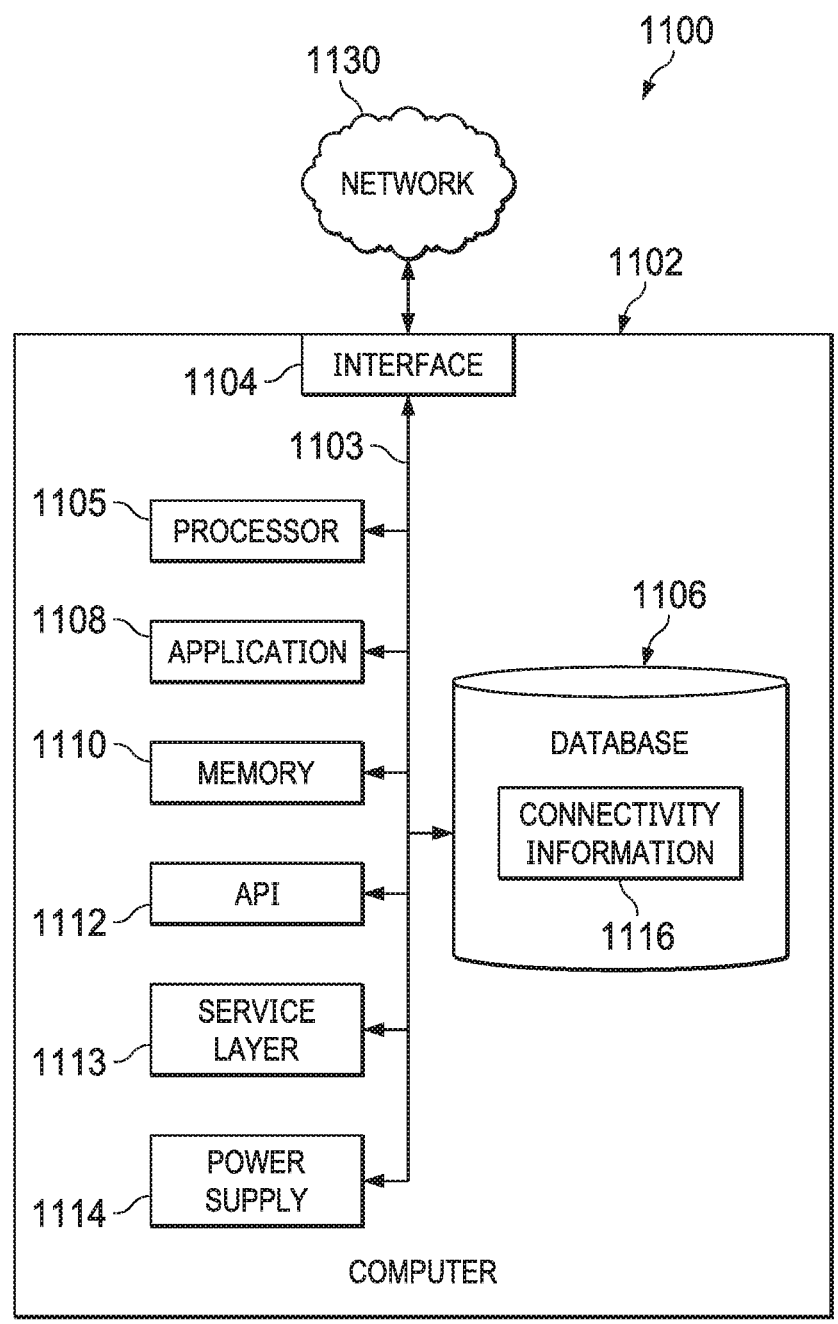
FIG. 11 is a block diagram of an example computer system used to provide computational functionalities associated with described algorithms, methods, functions, processes, flows, and procedures, as described in the instant disclosure, according to an implementation.

FIG. 11 is a block diagram of an example computer system 1100 used to provide computational functionalities associated with described algorithms, methods, functions, processes, flows, and procedures, as described in the present disclosure, according to an implementation. The illustrated computer 1102 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1102 may include a computer that includes an input device, such as a keypad, keyboard, touch screen, or other device that can accept user information, and an output device that conveys information associated with the operation of the computer 1102, including digital data, visual, or audio information (or a combination of information), or a graphical-type user interface (UI) (or GUI).

The computer 1102 can serve in a role as a client, network component, a server, a database or other persistency, or any other component (or a combination of roles) of a computer system for performing the subject matter described in the present disclosure. For example, the computer 1102 can be used to implement a domain controller, an ECU, or another network node in a vehicle network. The illustrated computer 1102 is communicably coupled with a network 1130. In some implementations, one or more components of the computer 1102 may be configured to operate within environments, including cloud-computing-based, local, global, or other environment (or a combination of environments). For example, the computer 1102 can be used to implement a computing platform in a cloud that is accessible via Internet. For example, the computer 1102 can be used during a system integration phase where car manufacturers upload their software (e.g., that deployed in vehicle networks of their cars) to the cloud. The computer 1102 can perform operations of the example process 700 for configuring firewall systems based on the software for vehicle networks and achieve other computational functionalities as described in the present disclosure. In some implementations, one or more of the computers 1102 can be used to implement certain computational functionalities associated with described algorithms, methods, functions, processes, flows, and procedures, as described in the present disclosure. For example, in some implementations, dynamic analysis is performed by two or more computing platforms implemented by the computers 1102. For example, one of the computing platforms can be a computer 1102 in the car itself, where packets are sniffed. There can also exist a computing platform in the car manufacturer's systems integration laboratory which is configuring the sniffing tests and extracting the results of the sniffing tests and then processing the results of the sniffing. Various implementations of the computational functionalities associated with described algorithms, methods, functions, processes, flows, and procedures, as described in the present disclosure can be achieved using the computer 1102.

At a high level, the computer 1102 is an electronic computing device operable to receive, transmit, process, store, or manage data and information associated with the described subject matter. According to some implementations, the computer 1102 may also include or be communicably coupled with an application server, e-mail server, web server, caching server, streaming data server, or other server (or a combination of servers).

The computer 1102 can receive requests over network 1130 from a client application (for example, executing on another computer 1102) and respond to the received requests by processing the received requests using an appropriate software application(s). In addition, requests may also be sent to the computer 1102 from internal users (for example, from a command console or by other appropriate access method), external or third-parties, other automated applications, as well as any other appropriate entities, individuals, systems, or computers. Each of the components of the computer 1102 can communicate using a system bus 1103. In some implementations, any or all of the components of the computer 1102, hardware or software (or a combination of both hardware and software), may interface with each other or the interface 1104 (or a combination of both), over the system bus 1103 using an application programming interface (API) 1112 or a service layer 1113 (or a combination of the API 1112 and service layer 1113). The API 1112 may include specifications for routines, data structures, and object classes. The API 1112 may be either computer-language independent or dependent and refer to a complete interface, a single function, or even a set of APIs. The service layer 1113 provides software services to the computer 1102 or other components (whether or not illustrated) that are communicably coupled to the computer 1102. The functionality of the computer 1102 may be accessible for all service consumers using this service layer. Software services, such as those provided by the service layer 1113, provide reusable, defined functionalities through a defined interface. For example, the interface may be software written in JAVA, C++, or other suitable language providing data in extensible markup language (XML) format or other suitable format. While illustrated as an integrated component of the computer 1102, alternative implementations may illustrate the API 1112 or the service layer 1113 as stand-alone components in relation to other components of the computer 1102 or other components (whether or not illustrated) that are communicably coupled to the computer 1102. Moreover, any or all parts of the API 1112 or the service layer 1113 may be implemented as child or sub-modules of another software module, enterprise application, or hardware module without departing from the scope of this disclosure.

The computer 1102 includes an interface 1104. Although illustrated as a single interface 1104 in FIG. 11, two or more interfaces 1104 may be used according to particular needs, desires, or particular implementations of the computer 1102. The interface 1104 is used by the computer 1102 for communicating with other systems that are connected to the network 1130 (whether illustrated or not) in a distributed environment. Generally, the interface 1104 includes logic encoded in software or hardware (or a combination of software and hardware) and is operable to communicate with the network 1130. More specifically, the interface 1104 may include software supporting one or more communication protocols associated with communications such that the network 1130 or interface's hardware is operable to communicate physical signals within and outside of the illustrated computer 1102.

The computer 1102 includes a processor 1105. Although illustrated as a single processor 1105 in FIG. 11, two or more processors may be used according to particular needs, desires, or particular implementations of the computer 1102. Generally, the processor 1105 executes instructions and manipulates data to perform the operations of the computer 1102 and any algorithms, methods, functions, processes, flows, and procedures as described in the instant disclosure.

The computer 1102 also includes a database 1106 that can hold data for the computer 1102 or other components (or a combination of both) that can be connected to the network 1130 (whether illustrated or not). For example, database 1106 can be an in-memory, conventional, or other type of database storing data consistent with this disclosure. In some implementations, database 1106 can be a combination of two or more different database types (for example, a hybrid in-memory and conventional database) according to particular needs, desires, or particular implementations of the computer 1102 and the described functionality. Although illustrated as a single database 1106 in FIG. 11, two or more databases (of the same or combination of types) can be used according to particular needs, desires, or particular implementations of the computer 1102 and the described functionality. While database 1106 is illustrated as an integral component of the computer 1102, in alternative implementations, database 1106 can be external to the computer 1102. As illustrated, the database 1106 holds previously described connectivity information 1116 of a vehicle network. The database 1106 can also hold additional or different information.

The computer 1102 also includes a memory 1110 that can hold data for the computer 1102 or other components (or a combination of both) that can be connected to the network 1130 (whether illustrated or not). Memory 1110 can store any data consistent with this disclosure. In some implementations, memory 1110 can be a combination of two or more different types of memory (for example, a combination of semiconductor and magnetic storage) according to particular needs, desires, or particular implementations of the computer 1102 and the described functionality. Although illustrated as a single memory 1110 in FIG. 11, two or more memories 1110 (of the same or combination of types) can be used according to particular needs, desires, or particular implementations of the computer 1102 and the described functionality. While memory 1110 is illustrated as an integral component of the computer 1102, in alternative implementations, memory 1110 can be external to the computer 1102.

The application 1108 is an algorithmic software engine providing functionality according to particular needs, desires, or particular implementations of the computer 1102, particularly with respect to functionality described in this disclosure. For example, application 1108 can serve as one or more components, modules, or applications. Further, although illustrated as a single application 1108, the application 1108 may be implemented as multiple applications 1108 on the computer 1102. In addition, although illustrated as integral to the computer 1102, in alternative implementations, the application 1108 can be external to the computer 1102.

The computer 1102 can also include a power supply 1114. The power supply 1114 can include a rechargeable or non-rechargeable battery that can be configured to be either user- or non-user-replaceable. In some implementations, the power supply 1114 can include power-conversion or management circuits (including recharging, standby, or other power management functionality). In some implementations, the power-supply 1114 can include a power plug to allow the computer 1102 to be plugged into a wall socket or other power source to, for example, power the computer 1102 or recharge a rechargeable battery.

There may be any number of computers 1102 associated with, or external to, a computer system containing computer 1102, each computer 1102 communicating over network 1130. Further, the term "client," "user," and other appropriate terminology may be used interchangeably, as appropriate, without departing from the scope of this disclosure. Moreover, this disclosure contemplates that many users may use one computer 1102, or that one user may use multiple computers 1102.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example QNX, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system including a computer memory interoperably coupled with a hardware processor configured to perform the computer-implemented method or the instructions stored on the computer-readable medium.

What is claimed is:

1. A computer-implemented method for configuring firewalls in a vehicle network that comprises a trusted network internal to a vehicle and an untrusted network external to the vehicle, wherein the trusted network comprises one or more functional domains for controlling functionalities of the vehicle, the computer-implemented method comprising:
   receiving, by at least one hardware processor, a software code of a network node connected to the trusted network;
   performing, by the at least one hardware processor, an analysis of the software code to identify connectivity of the network nodes in the vehicle network, wherein the performing the analysis comprises:
      turning off one or more firewalls in the vehicle network; and
      determining the connectivity paths by performing a packet sniffing;
   determining, by the at least one hardware processor, connectivity information of the network nodes in the vehicle network based on the analysis, wherein the connectivity information comprises at least one of Network Layer connectivity information, Transport Layer connectivity information, or Application Layer connectivity information; and
   configuring one or more firewalls in the vehicle network based on the connectivity information.

2. The method of claim 1, wherein the software code comprises one or more of an application source code, application assembly code, application binary code, configuration file, or manifest file.

3. The method of claim 1, wherein the one or more functional domains comprise one or more of an in-vehicle experience domain, powertrain and vehicle dynamics domain, driver replacement domain, or body and comfort domain.

4. The method of claim 1, wherein the trusted network comprises a network on one or more of an automobile, motorbike, train, maritime transport, or airplane.

5. The method of claim 1, wherein the trusted network comprises one or more of Ethernet, Controller Area Network (CAN), FlexRay, Media Oriented System Transport (MOST), or Local Interconnected Network (LIN).

6. The method of claim 1, wherein performing the static code analysis comprises determining one or more of: a server software, client software, communication protocol type, communication source address, communication destination address, application content type, application layer address, or dynamic assignment of a communication parameter.

7. The method of claim 1, wherein:
   the Network Layer connectivity information comprises one or more of a type of an Network Layer protocol, a source address pursuant to the type of the Network Layer protocol, a destination address pursuant to the type of the Network Layer protocol, or a type of dynamic address allocation pursuant to the type of the Network Layer protocol;
   the Transport Layer connectivity information comprises one or more of a type of Transport Layer protocol, a source address pursuant to the type of the Transport Layer protocol, or a destination address pursuant to the type of the Transport Layer protocol; and
   the Application Layer connectivity information comprises one or more of a type of an Application Layer protocol, a source address pursuant to the type of the Application Layer protocol, a destination address pursuant to the type of the Application Layer protocol, a type of Service-Oriented or non-Service-Oriented connectivity, or one or more of used Uniform Resource Locators (URLs).

8. The method of claim 1, wherein performing the analysis of the software code comprises performing one or more of a static analysis or a dynamic analysis of the software code.

9. The method of claim 1, wherein configuring one or more firewalls in the vehicle network based on the connectivity information comprises configuring a firewall on a domain controller of the one or more functional domains in the vehicle network to secure inter-domain communications.

10. The method of claim 1, wherein configuring one or more firewalls in the vehicle network based on the connectivity information comprises configuring a firewall on a gateway node in the vehicle network to secure intra-domain communications, inter-domain communications, or both.

11. The method of claim 1, wherein configuring one or more firewalls in the vehicle network based on the connectivity information comprises configuring a firewall on a domain controller of the one or more functional domains in the vehicle network to secure intra-domain communications.

12. The method of claim 1, wherein configuring one or more firewalls in the vehicle network based on the connectivity information comprises configuring a firewall on a network node within a domain in the vehicle network to secure intra-domain communications.

13. The method of claim 1, wherein configuring one or more firewalls in the vehicle network based on the connectivity information comprises provisioning a file detailing differences between the determined connectivity information of the vehicle network and a designed connectivity of the vehicle network.

14. The method of claim 1, wherein configuring one or more firewalls in the vehicle network based on the connectivity information comprises generating a file comprising a firewall configuration.

15. The method of claim 1, further comprising providing a warning of a failure to obtain connectivity information of a network node in the vehicle network based on the analysis.

16. The method of claim 1, further comprising performing intrusion detection.

17. The method of claim 16, wherein the performing intrusion detection comprises:
   identifying a packet that is not in a whitelist based on the determined connectivity information of the vehicle network;
   logging characteristics of the identified packet that is not in the whitelist; and
   reporting to a server the characteristics of the identified packet that is not in the whitelist.

18. The method of claim 1, further comprising performing customization of configurations of the one or more firewalls according to the network nodes deployed on a particular vehicle.

19. The method of claim 1, further comprising:
receiving an updated software code of a network node of the trusted network;
performing an analysis of the updated software code to identify connectivity of the network nodes in the vehicle network;
determining, by the at least one hardware processor, updated connectivity information of the network nodes in the vehicle network based on the analysis; and
updating configurations of the one or more firewalls in the vehicle network based on the updated connectivity information.

20. One or more non-transitory computer-readable media containing instructions which, when executed, cause a computing device to perform operations comprising:
receiving a software code of a network node connected to a trusted network of a vehicle network that comprises the trusted network internal to a vehicle and an untrusted network external to the vehicle, wherein the trusted network comprises one or more functional domains for controlling functionalities of the vehicle;
performing an analysis of the software code to identify connectivity of the network nodes in the vehicle network, wherein the performing the analysis comprises:
turning off one or more firewalls in the vehicle network; and
determining the connectivity paths by performing a packet sniffing;
determining connectivity information of the network nodes in the vehicle network based on the analysis, wherein the connectivity information comprises at least one of Network Layer connectivity information, Transport Layer connectivity information, or Application Layer connectivity information; and
configuring one or more firewalls in the vehicle network based on the connectivity information.

21. A device, including:
at least one hardware processor; and
one or more computer-readable storage media coupled to the at least one hardware processor and storing programming instructions for execution by the at least one hardware processor, wherein the programming instructions, when executed, cause the at least one hardware processor to perform operations including:
receiving a software code of a network node connected to a trusted network of a vehicle network that comprises the trusted network internal to a vehicle and an untrusted network external to the vehicle, wherein the trusted network comprises one or more functional domains for controlling functionalities of the vehicle;
performing an analysis of the software code to identify connectivity of the network nodes in the vehicle network, wherein the performing the analysis comprises:
turning off one or more firewalls in the vehicle network; and
determining the connectivity paths by performing a packet sniffing;
determining connectivity information of the network nodes in the vehicle network based on the analysis, wherein the connectivity information comprises at least one of Network Layer connectivity information, Transport Layer connectivity information, or Application Layer connectivity information; and
configuring one or more firewalls in the vehicle network based on the connectivity information.

* * * * *